(12) United States Patent
Slocum et al.

(10) Patent No.: US 10,566,603 B2
(45) Date of Patent: Feb. 18, 2020

(54) STATIONARY SEMI-SOLID BATTERY MODULE AND METHOD OF MANUFACTURE

(71) Applicant: 24M Technologies, Inc., Cambridge, MA (US)

(72) Inventors: Alexander H. Slocum, Bow, NH (US); Tristan Doherty, Somerville, MA (US); Ricardo Bazzarella, Woburn, MA (US); James C. Cross, III, Carlisle, MA (US); Pimpa Limthongkul, Boston, MA (US); Mihai Duduta, Somerville, MA (US); Jeffry Disko, North Brookfield, MA (US); Allen Yang, Cambridge, MA (US); Throop Wilder, Lincoln, MA (US); William Craig Carter, Jamaica Plain, MA (US); Yet-Ming Chiang, Weston, MA (US)

(73) Assignee: 24M Technologies, Inc., Cambridge, MA (US)

( * ) Notice: Subject to any disclaimer, the term of this patent is extended or adjusted under 35 U.S.C. 154(b) by 761 days.

(21) Appl. No.: 14/926,760

(22) Filed: Oct. 29, 2015

(65) Prior Publication Data

US 2016/0190544 A1 Jun. 30, 2016

Related U.S. Application Data

(63) Continuation of application No. 13/607,021, filed on Sep. 7, 2012, now Pat. No. 9,203,092.

(Continued)

(51) Int. Cl.
*H01M 4/04* (2006.01)
*H01M 4/76* (2006.01)
(Continued)

(52) U.S. Cl.
CPC ....... *H01M 4/0433* (2013.01); *H01M 4/0478* (2013.01); *H01M 4/76* (2013.01);
(Continued)

(58) Field of Classification Search
CPC ........ H01M 4/04; H01M 4/0478; H01M 4/00; H01M 4/0404; H01M 2004/023
See application file for complete search history.

(56) References Cited

U.S. PATENT DOCUMENTS 2,208,028 A 7/1940 Harrington
3,624,628 A 11/1971 Schmidt
(Continued)

FOREIGN PATENT DOCUMENTS

CN 1333929 A 1/2002
CN 1354529 6/2002
(Continued)

OTHER PUBLICATIONS

Notification of the Second Office Action for Chinese Application No. 201280051582.5, dated Aug. 26, 2016, 7 pages.
(Continued)

*Primary Examiner* — Austin Murata
(74) *Attorney, Agent, or Firm* — Cooley LLP

(57) ABSTRACT

A method of manufacturing an electrochemical cell includes transferring an anode semi-solid suspension to an anode compartment defined at least in part by an anode current collector and an separator spaced apart from the anode collector. The method also includes transferring a cathode semi-solid suspension to a cathode compartment defined at least in part by a cathode current collector and the separator spaced apart from the cathode collector. The transferring of the anode semi-solid suspension to the anode compartment and the cathode semi-solid to the cathode compartment is such that a difference between a minimum distance and a maximum distance between the anode current collector and the separator is maintained within a predetermined tolerance. The method includes sealing the anode compartment and the cathode compartment.

21 Claims, 13 Drawing Sheets

Related U.S. Application Data

(60) Provisional application No. 61/531,927, filed on Sep. 7, 2011.

(51) Int. Cl.
   *H01M 10/052* (2010.01)
   *H01M 4/02* (2006.01)

(52) U.S. Cl.
   CPC .... *H01M 10/052* (2013.01); *H01M 2004/023* (2013.01); *Y10T 29/4911* (2015.01); *Y10T 29/49108* (2015.01)

(56) References Cited

U.S. PATENT DOCUMENTS

| | | | |
|---|---|---|---|
| 4,080,728 A | 3/1978 | Buckler | |
| 4,105,815 A * | 8/1978 | Buckler | H01M 4/50 429/152 |
| 4,199,912 A | 4/1980 | James, Jr. et al. | |
| 4,386,019 A | 5/1983 | Kann et al. | |
| 4,695,355 A | 9/1987 | Koziol | |
| 4,818,643 A | 4/1989 | Cook et al. | |
| 4,925,752 A | 5/1990 | Fauteux et al. | |
| 5,316,556 A | 5/1994 | Morris | |
| 5,582,931 A | 12/1996 | Kawakami | |
| 5,603,770 A * | 2/1997 | Sato | B05C 5/0254 118/621 |
| 5,612,152 A | 3/1997 | Bates | |
| 5,674,556 A | 10/1997 | Fukumura et al. | |
| 5,697,145 A | 12/1997 | Fukumura et al. | |
| 5,725,822 A | 3/1998 | Keller et al. | |
| 5,749,927 A | 5/1998 | Chern et al. | |
| 5,792,576 A | 8/1998 | Xing et al. | |
| 5,834,052 A | 11/1998 | Fukumura et al. | |
| 5,837,397 A | 11/1998 | Xing | |
| 6,207,322 B1 | 3/2001 | Kelsey et al. | |
| 6,264,707 B1 | 7/2001 | Ishikawa et al. | |
| 6,284,192 B1 | 9/2001 | Coonan et al. | |
| 6,287,722 B1 | 9/2001 | Barton et al. | |
| 6,291,091 B1 | 9/2001 | Preischl et al. | |
| 6,368,365 B1 * | 4/2002 | Chi | H01M 4/8864 156/244.24 |
| 6,403,262 B1 | 6/2002 | Xing et al. | |
| 6,461,757 B1 | 10/2002 | Sasayama et al. | |
| 6,503,432 B1 | 1/2003 | Barton et al. | |
| 6,503,657 B1 | 1/2003 | Takami et al. | |
| 6,576,365 B1 | 6/2003 | Meitav et al. | |
| 6,589,299 B2 | 7/2003 | Missling et al. | |
| 6,939,383 B2 | 9/2005 | Eastin et al. | |
| 6,986,967 B2 | 1/2006 | Barton et al. | |
| 7,022,391 B2 | 4/2006 | Kawai et al. | |
| 7,041,380 B2 | 5/2006 | Yamashita et al. | |
| 7,338,734 B2 | 3/2008 | Chiang et al. | |
| 7,524,577 B2 | 4/2009 | Bates | |
| 7,700,019 B2 | 4/2010 | Lavoie et al. | |
| 7,846,575 B2 | 12/2010 | Heller, Jr. et al. | |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 9,831,518 B2 | 11/2017 | Chiang et al. | |
| 9,831,519 B2 | 11/2017 | Chiang et al. | |
| 9,831,522 B2 | 11/2017 | Tan et al. | |
| 10,115,970 B2 | 10/2018 | Ota et al. | |
| 10,122,044 B2 | 11/2018 | Tan et al. | |
| 10,153,651 B2 | 12/2018 | Taylor et al. | |
| 10,181,587 B2 | 1/2019 | Ota et al. | |
| 10,230,128 B2 | 3/2019 | Chiang et al. | |
| 10,236,518 B2 | 3/2019 | Chiang et al. | |
| 2001/0012588 A1 * | 8/2001 | Kaido | H01M 4/04 429/233 |
| 2001/0021471 A1 | 9/2001 | Xing et al. | |
| 2002/0106561 A1 | 8/2002 | Lee et al. | |
| 2003/0116881 A1 * | 6/2003 | Nelson | B05C 5/007 264/177.16 |
| 2004/0029001 A1 | 2/2004 | Yamazaki et al. | |
| 2004/0029008 A1 | 2/2004 | Winterberg et al. | |
| 2004/0029311 A1 | 2/2004 | Snyder et al. | |
| 2005/0064270 A1 | 3/2005 | Marionowski | |
| 2005/0214648 A1 | 9/2005 | Boulton et al. | |
| 2006/0046137 A1 | 3/2006 | Kodama | |
| 2006/0057433 A1 | 3/2006 | Ando et al. | |
| 2007/0034251 A1 * | 2/2007 | Jonczyk | H01L 31/0236 136/252 |
| 2008/0096110 A1 | 4/2008 | Bito et al. | |
| 2008/0289676 A1 | 11/2008 | Guidotti et al. | |
| 2009/0023041 A1 | 1/2009 | Cooper | |
| 2009/0029259 A1 | 1/2009 | Okazaki et al. | |
| 2010/0040942 A1 | 2/2010 | Hatta et al. | |
| 2010/0047671 A1 | 2/2010 | Chiang et al. | |
| 2010/0112454 A1 | 5/2010 | Visco et al. | |
| 2010/0196800 A1 | 8/2010 | Markoski et al. | |
| 2010/0323264 A1 | 12/2010 | Chiang et al. | |
| 2011/0086258 A1 | 4/2011 | Yaginuma et al. | |
| 2011/0104527 A1 | 5/2011 | Choi et al. | |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2011/0287314 A1 | 11/2011 | Jung | |
| 2011/0311857 A1 | 12/2011 | Tucholski | |
| 2012/0003547 A1 * | 1/2012 | Raj | H01M 4/0404 429/322 |
| 2012/0058378 A1 | 3/2012 | Lee et al. | |
| 2012/0070715 A1 | 3/2012 | Obika | |
| 2012/0164499 A1 | 6/2012 | Chiang et al. | |
| 2013/0000110 A1 | 1/2013 | Takeda et al. | |
| 2013/0055559 A1 | 3/2013 | Slocum et al. | |
| 2013/0065122 A1 | 3/2013 | Chiang et al. | |
| 2013/0309547 A1 | 11/2013 | Bazzarella et al. | |
| 2013/0337319 A1 | 12/2013 | Doherty et al. | |
| 2014/0004437 A1 | 1/2014 | Slocum et al. | |
| 2014/0008006 A1 | 1/2014 | Lee et al. | |
| 2014/0030623 A1 | 1/2014 | Chiang et al. | |
| 2014/0039710 A1 | 2/2014 | Carter et al. | |
| 2014/0131630 A1 | 5/2014 | Hwang et al. | |
| 2014/0154546 A1 | 6/2014 | Carter et al. | |
| 2014/0154565 A1 | 6/2014 | Ku et al. | |
| 2014/0170524 A1 | 6/2014 | Chiang et al. | |
| 2014/0248521 A1 | 9/2014 | Chiang et al. | |
| 2014/0272547 A1 | 9/2014 | Ramasubramanian et al. | |
| 2014/0315097 A1 | 10/2014 | Tan et al. | |
| 2014/0356736 A1 | 12/2014 | Choi et al. | |
| 2014/0363721 A1 | 12/2014 | Bhola et al. | |
| 2015/0024279 A1 | 1/2015 | Tan et al. | |
| 2015/0027615 A1 | 1/2015 | Singh et al. | |
| 2015/0129081 A1 | 5/2015 | Chiang et al. | |
| 2015/0140371 A1 | 5/2015 | Slocum et al. | |
| 2015/0155596 A1 | 6/2015 | Gardner | |
| 2015/0171406 A1 | 6/2015 | Bazzarella et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0056490 A1 | 2/2016 | Chiang et al. | |
| 2016/0056491 A1 | 2/2016 | Chiang et al. | |
| 2016/0105042 A1 | 4/2016 | Taylor et al. | |
| 2016/0126543 A1 | 5/2016 | Ota et al. | |
| 2016/0133916 A1 | 5/2016 | Zagars et al. | |
| 2016/0218375 A1 | 7/2016 | Chiang et al. | |

(56) References Cited

U.S. PATENT DOCUMENTS

| | | |
|---|---|---|
| 2016/0268621 A1 | 9/2016 | Chiang et al. |
| 2016/0301038 A1 | 10/2016 | Modest et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Hol |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |

FOREIGN PATENT DOCUMENTS

| | | |
|---|---|---|
| CN | 101212070 | 7/2008 |
| CN | 102983369 A | 3/2013 |
| CN | 104040764 A | 9/2014 |
| EP | 0602976 A1 | 6/1994 |
| JP | H11-111265 | 4/1999 |
| JP | 2003-532277 T | 10/2003 |
| JP | 2003-317731 A | 11/2003 |
| JP | 2005-056729 A | 3/2005 |
| JP | 2006-172766 A | 6/2006 |
| JP | 2006-172773 A | 6/2006 |
| JP | 2006-269288 A | 10/2006 |
| JP | 2007-115678 A | 5/2007 |
| JP | 2007-335283 | 12/2007 |
| JP | 2009-176513 A | 8/2009 |
| JP | 2010-062008 | 3/2010 |
| JP | 2010-245000 A | 10/2010 |
| JP | 2011-077269 | 4/2011 |
| WO | WO 2001/041232 | 7/2001 |
| WO | WO 2010/118060 | 10/2010 |
| WO | WO 2010/137415 | 12/2010 |
| WO | WO 2010/150077 | 12/2010 |
| WO | WO 2011/052094 | 5/2011 |
| WO | WO 2011/099793 | 8/2011 |
| WO | WO 2012/024499 | 2/2012 |
| WO | WO 2012/088442 | 6/2012 |
| WO | WO 2016/073575 | 5/2016 |

OTHER PUBLICATIONS

Office Action for European Application No. 12830248.6, dated Jan. 19, 2017, 5 pages.

Notice of Reasons for Rejection for Japanese Patent Application No. 2014-529905, dated Jun. 29, 2016, 9 pages.

Office Action for U.S. Appl. No. 13/606,986, dated Jun. 3, 2016, 18 pages.

Office Action for U.S. Appl. No. 13/606,986, dated Jan. 26, 2017, 16 pages.

Office Action for U.S. Appl. No. 13/832,836, dated Feb. 26, 2015, 9 pages.

Supplementary European Search Report for European Application No. 13791074.1, dated Mar. 31, 2016, 6 pages.

Office Action for U.S. Appl. No. 14/543,489, dated Jul. 6, 2015, 9 pages.

Office Action for U.S. Appl. No. 14/543,489, dated Feb. 12, 2016, 7 pages.

International Search Report and Written Opinion for International Application No. PCT/US2013/041537, dated Oct. 10, 2013.

International Search Report and Written Opinion for International Application No. PCT/US2015/058992, dated Jan. 14, 2016, 10 pages.

International Search Report and Written Opinion for International Application No. PCT/US2016/038098, dated Oct. 31, 2016, 14 pages.

Armand, M. et al., "Conjugated dicarboxylate anodes for Li-ion batteries," Nature Materials, 8:120-125 (2009).

Bervas, M. et al., "Investigation of the Lithiation and Delithiation Conversion Mechanisms in a Bismuth Fluoride Nanocomposites," Journal of The Electrochemical Society, 153(4):A799-A808 (2006).

Chan, C. K. et al., "High-performance lithium battery anodes using silicon nanowires," Nature Nanotechnology, 3:31-35 (2008).

Li, H. et al., "Li-Storage via Heterogeneous Reaction in Selected Binary Metal Fluorides and Oxides," Journal of Electrochemical Society, 151(11):A1878-A1885 (2004).

Nakahara, K. et al. "Rechargeable batteries with organic radical cathodes," Chemical Physics Letters, 359:351-354 (2002).

Nishide, H. et al., "Organic radical battery: nitroxide polymers as a cathode-active material," Electrochimica Acta, 50:827-831 (2004).

Plitz, I. et al., "Structure and Electrochemistry of Carbon-Metal Fluoride Nanocomposites Fabricated by a Solid State Redox Conversion Reaction", Journal of The Electrochemical Society, 152(2):A307-A315 (2005).

Notice of Reasons for Rejection for Japanese Application No. 2015-512878, dated Apr. 19, 2017, 7 pages.

Office Action for U.S. Appl. No. 15/188,374, dated Apr. 12, 2017, 9 pages.

Office Action for U.S. Appl. No. 15/185,625, dated Nov. 2, 2017, 11 pages.

International Search Report and Written Opinion for International Application No. PCT/US2012/054219, dated Feb. 21, 2013, 13 pages.

Supplementary European Search Report for European Application No. 12830248.6, dated Mar. 6, 2015, 6 pages.

International Search Report and Written Opinion for International Application No. PCT/US2012/054218, dated Feb. 15, 2013, 10 pages.

Duduta, M. et al., "Semi-Solid Lithium Rechargeable Flow Battery," Advanced Energy Materials. 1(4):511-516 (2011).

Office Action for U.S. Appl. No. 13/607,021, dated Apr. 20, 2015, 8 pages.

Office Action for U.S. Appl. No. 13/607,021, dated Jul. 10, 2015, 4 pages.

Office Action for Chinese Application No. 201280051582.5, dated Nov. 4, 2015.

Office Action for U.S. Appl. No. 13/606,986, dated Jan. 14, 2016, 14 pages.

Office Action for European Application No. 13791074.1, dated Aug. 7, 2018, 5 pages.

Notice of Reasons for Rejection for Japanese Application No. 2015-512878, dated Mar. 29, 2019, 13 pages.

Notice of Reasons for Rejection for Japanese Application No. 2018-088757, dated Apr. 8, 2019, 9 pages.

Office Action for U.S. Appl. No. 15/724,701, dated Apr. 4, 2019, 8 pages.

First Office Action for Chinese Application No. 201580057914.4, dated Jul. 8, 2019, 17 pages.

Office Action for European Application No. 15794037.0, dated Jun. 4, 2019, 9 pages.

Office Action for U.S. Appl. No. 14/932,153, dated Aug. 7, 2018, 6 pages.

Office Action for U.S. Appl. No. 14/932,153, dated Jan. 31, 2019, 7 pages.

First Office Action for Chinese Application No. 201680004584.7, dated Feb. 3, 2019, 17 pages.

Extended European Search Report for European Application No. 16812533.4, dated Nov. 19, 2018, 7 pages.

Substantive Examination Report (Restriction) for Philippines Patent Application No. 1-2017-500970, dated Mar. 14, 2019, 3 pages.

(56) References Cited

OTHER PUBLICATIONS

Office Action for U.S. Appl. No. 15/185,625, dated May 18, 2018, 9 pages.

* cited by examiner

STATIONARY SEMI-SOLID BATTERY MODULE AND METHOD OF MANUFACTURE

CROSS-REFERENCE TO RELATED APPLICATIONS

This application is a Continuation of U.S. patent application Ser. No. 13/607,021, filed Sep. 7, 2012, now U.S. Pat. No. 9,203,092, entitled "Stationary Semi-Solid Battery Module and Method of Manufacture," which claims priority to and the benefit of U.S. Provisional Application No. 61/531,927, filed Sep. 7, 2011, entitled "Battery Manufacturing Method," the disclosure of each of which is incorporated by reference herein in its entirety.

BACKGROUND

Embodiments described herein relate generally to the preparation of electrode cells for use in electrochemical devices and more particularly to systems and methods of using a semi-solid electrode cell in a battery module.

Conventional battery systems store electrochemical energy by separating an ion source and ion sink at differing ion electrochemical potential. A difference in electrochemical potential produces a voltage difference between the positive and negative electrodes, which produces an electric current if the electrodes are connected by a conductive element. In a convention battery system, negative electrodes and positive electrodes are connected via a parallel configuration of two conductive elements. The external elements exclusively conduct electrons, however, the internal elements, being separated by a separator and electrolyte, exclusively conduct ions. The external and internal flow streams supply ions and electrons at the same rate, as a charge imbalance cannot be sustained between the negative electrode and positive electrode. The produced electric current can be used to drive an external device. A rechargeable battery can be recharged by application of an opposing voltage difference that drives electric and ionic current in an opposite direction as that of a discharging battery. Accordingly, active material of a rechargeable battery requires the ability to accept and provide ions. Increased electrochemical potentials produce larger voltage differences between the cathode and anode of a battery, which increases the electrochemically stored energy per unit mass of the battery. For high-power batteries, the ionic sources and sinks are connected to a separator by an element with large ionic conductivity, and to the current collectors with high electric conductivity elements.

Typical battery manufacturing involves numerous complex and costly processes carried out in series, each of which is subject to yield losses, incurs capital costs for equipment, and includes operating expenses for energy consumption and consumable materials. The process first involves making separate anodic and cathodic mixtures that are typically mixtures of electrochemically active ion storage compounds, electronically conductive additives, and polymer binders. The mixtures are coated onto the surfaces of flexible metal foils and subsequently compressed under high pressure to increase density and control thickness. These compressed electrode/foil composites are then slitted into sizes and/or shapes that are appropriate for the particular form factor of the manufactured battery. The slitted electrode composites are typically co-wound or co-stacked with intervening ionically-conductive/electronically-insulating separator membranes to construct battery windings, i.e. "jelly rolls" or "stacks," which are then packaged in metal cans, flexible polymer pouches, etc. The resulting cells can be infiltrated with liquid electrolyte that need be introduced in a carefully controlled environment.

The stored energy or charge capacity of a manufactured battery is related to the inherent charge capacity of the active materials (mAh/g), the volume of the electrodes ($cm^3$), the product of the thickness, area, and number of layers, and the loading of active material in the electrode media (e.g., grams of active material/cubic centimeters of electrode media. Therefore, to enhance commercial appeal (e.g., increased energy density and decreased cost), it is generally desirable to increase areal charge capacity ($mAh/cm^2$) of the electrodes that are to be disposed in a given battery form factor, which depends on electrode thickness and active material loading. Moreover, it is desirable to increase electrical conduction between the current collector and the electrode material. For example, it can be desirable to increase the surface area of the current collector that is in physical and/or electrical connection with a semi-solid electrode material.

Binder-free electrode formulations can exhibit a wide range of rheological characteristics depending on their constituent types (e.g., composition), component concentrations, manner of preparation, and electrochemical and/or temporal history. Furthermore, in gravitational fields and/or when subjected to shear gradients during mixing or flow, particle segregation can occur, depending on relative densities, particles shapes and sizes, and carrier fluid properties (e.g., viscosity, and flow geometry) that can lead to non-uniformity of the electrode formulations. Thus, a need exists for an electrode that does not substantially include a binder agent and for a manufacturing process that addresses the rheological characteristics of a binder-free electrode.

SUMMARY

Systems and methods of using a semi-solid suspension in an electrochemical cell are described herein. In some embodiments, a method of manufacturing an electrochemical cell includes transferring an anode semi-solid suspension to an anode compartment defined at least in part by an anode current collector and a separator (e.g., an ion permeable membrane) spaced apart from the anode collector. The method also includes transferring a cathode semi-solid suspension to a cathode compartment defined at least in part by a cathode current collector and the separator spaced apart from the cathode current collector. The transferring of the anode semi-solid suspension to the anode compartment and the cathode semi-solid to the cathode compartment is such that a difference between a minimum distance and a maximum distance between the anode current collector and the ion permeable membrane is maintained within a predetermined tolerance. The method includes sealing the anode compartment and the cathode compartment.

DETAILED DESCRIPTION

Figure 1:
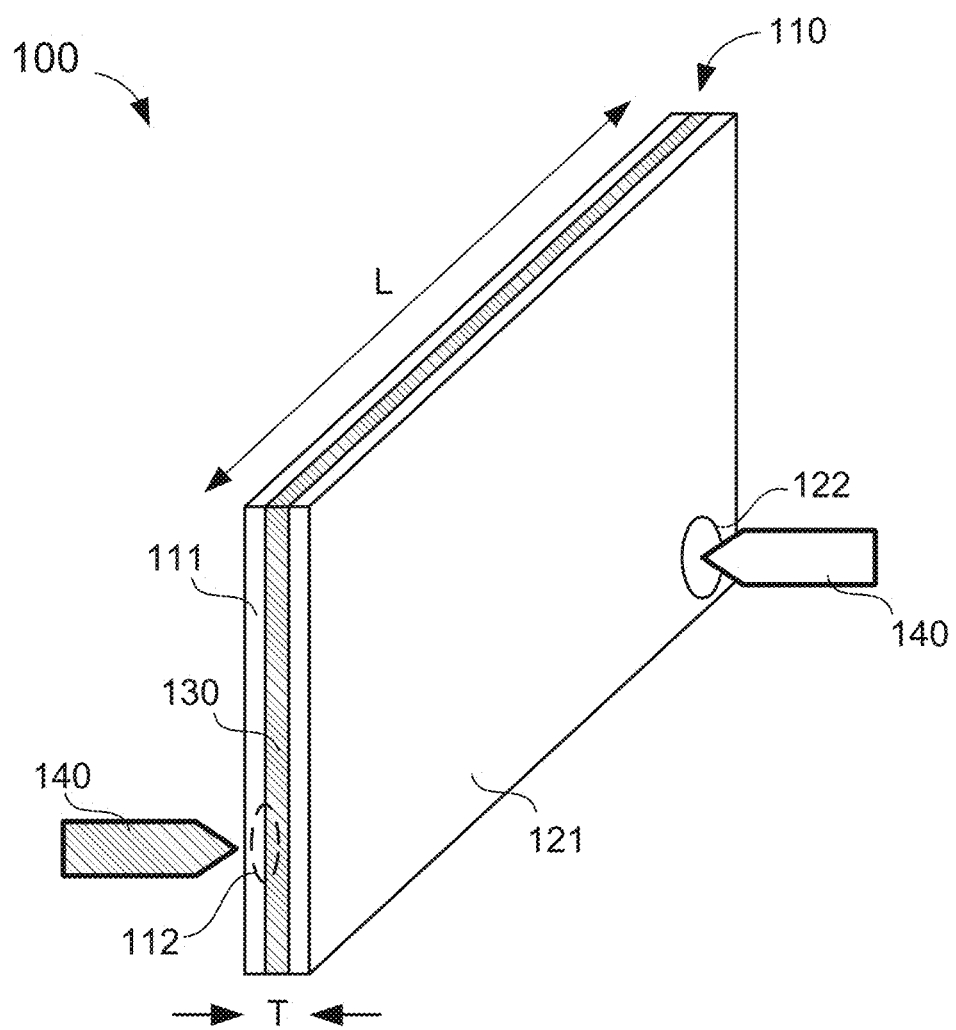
FIG. 1 is a schematic illustration of a filling technique used to fill a compartment with an electrode, according to an embodiment.

Embodiments described herein relate generally to the preparation of electrodes for use in electrochemical devices and more particularly to systems and methods of using a semi-solid suspension (also referred to herein as "slurry") in a battery module. In some embodiments, electrochemical devices (e.g., batteries) manufactured directly with a semi-solid suspension avoid the use of conventional binding agents and the electrode casting step altogether. Some benefits of this approach include, for example: (i) a simplified manufacturing process with less equipment (i.e., less capital intensive), (ii) the ability to manufacture electrodes of different thicknesses and shapes (e.g., by changing an extrusion die slot dimension), (iii) processing of thicker (>100 μm) and higher charge capacity (mAh/cm$^2$) electrodes, thereby decreasing the volume, mass, and cost contributions of inactive components with respect to active material, and (iv) the elimination of binding agents, thereby reducing tortuosity and increasing ionic conductivity of the electrode. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

The cathode and/or anode materials described herein can be a flowable semi-solid or condensed liquid composition. A flowable anodic semi-solid (also referred to herein as "anolyte") and/or a flowable cathodic semi-solid (also referred to herein as "catholyte") are/is comprised of a suspension of electrochemically-active agents (anode particulates and/or cathode particulates) and, optionally, electronically conductive particles (e.g., carbon). The cathodic particles and conductive particles are co-suspended in an electrolyte to produce a catholyte semi-solid. The anodic particles and conductive particles are co-suspended in an electrolyte to produce an anolyte semi-solid. The semi-solids are capable of flowing in response to an applied pressure differential, gravitational field, or other imposed acceleration field, that produces exerts or produces a force on the semi-solid, and optionally, with the aid of mechanical vibration.

As used herein, the term "semi-solid" refers to a material that is a mixture of liquid and solid phases, for example, such as a particle suspension, colloidal suspension, emulsion, gel, or micelle.

As used herein, the terms "condensed ion-storing liquid" or "condensed liquid" refers to a liquid that is not merely a solvent, as in the case of an aqueous flow cell catholyte or anolyte, but rather, that is itself redox-active. Of course, such a liquid form may also be diluted by or mixed with another, non-redox-active liquid that is a diluent or solvent, including mixing with such a diluent to form a lower-melting liquid phase, emulsion or micelles including the ion-storing liquid.

As used in this specification, the terms "about" and "approximately" generally include plus or minus 10% of the value stated. For example, about 5 would include 4.5 to 5.5, approximately 10 would include 9 to 11, and about 100 would include 90 to 110.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

In some embodiments, a method of manufacturing an electrochemical cell includes transferring an anode semi-solid suspension to an anode compartment defined at least in part by an anode current collector and an ion permeable membrane spaced apart from the anode collector. The method also includes transferring a cathode semi-solid suspension to a cathode compartment defined at least in part by a cathode current collector and the ion permeable membrane spaced apart from the cathode current collector. The transferring of the anode semi-solid suspension to the anode compartment and the cathode semi-solid to the cathode compartment is preferably performed such that a difference between a minimum distance and a maximum distance between the anode current collector and the ion permeable membrane is maintained within a predetermined tolerance. The method includes sealing the anode compartment and the cathode compartment.

In some embodiments, a method of manufacturing an electrochemical cell includes disposing an injection nozzle in an electrode cell (e.g., an anode and/or cathode cell) that is defined, at least in part, by a current collector and an ion permeable membrane. A semi-solid suspension electrode material can be transferred to the electrode compartment through the injection nozzle. The method further includes withdrawing the injection nozzle from the electrode compartment during at least a portion of the transferring.

In some embodiments, a method of manufacturing an electrochemical cell includes disposing an anode injection nozzle in an anode compartment that is defined, at least in part, by an anode current collector spaced apart from an ion permeable membrane. An anode semi-solid suspension can be transferred to the anode compartment through the anode injection nozzle and the anode injection nozzle can be withdrawn from the anode compartment during at least a portion of the transferring. The method further includes disposing a cathode injection nozzle in a cathode compartment that is defined, at least in part, by a cathode current collector spaced apart from an ion permeable membrane. A cathode semi-solid suspension can be transferred to the cathode compartment through the cathode injection nozzle and the cathode injection nozzle can be withdrawn from the cathode compartment during at least a portion of the transferring.

In some embodiments, a method of manufacturing an electrode for an electrochemical cell includes discharging semi-solid suspension electrode material through an extrusion die slot to form an electrode. The formed electrode can be transferred to an electrode compartment defined, at least in part, by a current collector and an ion permeable membrane. The method further includes transferring an electrolyte to the electrode compartment.

In some embodiments, a method of manufacturing an electrode for an electrochemical cell includes filling an electrode compartment defined, at least in part, by a current collector and an ion permeable membrane with an electrode material in powdered form. The electrode compartment can be placed in an electrolyte vapor-containing environment such that at least a portion of the gaseous electrolyte condenses to liquid form in the electrode compartment. The method further includes sealing the electrode compartment.

In some embodiments, an anolyte and a catholyte are introduced into an electrode cell via ports disposed along an edge of the electrode cell. For example, FIG. 1 is an illustration of a system 100 for filling a battery cell 110, according to an embodiment. The battery cell 110 can be a bipolar cell consisting of an anode cell 111, a cathode cell 121, and a separator 130 disposed therebetween. The anode cell 111 and the cathode cell 121 are each bounded by a current collector (not shown in FIG. 1) spaced apart from the separator 130. In this manner, the anode cell 111 and the cathode cell 121 each form a compartment (not shown in FIG. 1). The anode compartment of the anode cell 111 is configured to receive an anolyte slurry and the cathode compartment of the cathode cell 121 is configured to receive a catholyte slurry. The separator 130 can be, for example, an ion-permeable membrane.

The battery cell 110 can be, for example, substantially rectangular (as shown in FIG. 1), having a relatively large length L and relatively small thickness T. More specifically, the anode cell 111 and the cathode cell 121, that at least partially comprise the battery cell 110, are relatively long and thin, thus, the anode compartment and the cathode compartment are relatively long and relatively thin compartments. In some embodiments, the length of the anode cell 111 and/or cathode cell 121 can be in the range of about 5 cm to about 25 cm. In some embodiments, the length of the anode cell 111 and/or cathode cell 121 can be in the range of about 10 cm to about 20 cm. In some embodiments, the length of the anode cell 111 and/or cathode cell 121 can be in the range of about 15 cm to about 20 cm. In some embodiments, the thickness of the anode cell 111 and/or cathode cell 121 can be in the range of about 100 µm to about 1 mm. In some embodiments, the thickness of the anode cell 111 and/or cathode cell 121 can be in the range of about 250 µm to about 750 µm. In some embodiments, the thickness of the anode cell 111 and/or cathode cell 121 can be about 500 µm. Thus, the anode cell 111 and/or the cathode cell 121 can have a relatively high aspect ratio in the range of at least about 50 to at least about 2,500. In some embodiments, the anode cell 111 and/or the cathode cell 121 can have a relatively high aspect ratio in the range of at least about 100 to at least about 1,200. In some embodiments, the anode cell 111 and/or the cathode cell 121 can have a relatively high aspect ratio in the range of at least about 100 to at least about 600. In some embodiments, the anode cell 111 and/or the cathode cell 121 can have a relatively high aspect ratio of at least about 50, of at least about 100, of at least about 200, of at least about 300, of at least about 400, or of at least about 500.

While the geometry of the anode cell 111 and the cathode cell 121 is shown in FIG. 1 as substantially rectangular, the compartments formed by the anode cell 111 and the cathode cell 121 can have any suitable geometry. For example, in some embodiments, the geometry of the compartments can be polygonal (rectangular, hexagonal, etc.) or oval (elliptical, circular, etc.). Moreover, the compartments can have a uniform thickness or can vary in thickness spatially along the anode cell 111 and/or cathode cell 121. In some embodiments, the anode cell 111 and the cathode cell 121 can include partitions and/or support structure within the compartments that can provide structural support (e.g., for the current collectors and/or the separator 130) and/or facilitate desired fluid dynamic properties. For example, in some embodiments, the anode cell 111 and/or the cathode cell 121 can include support pins (not shown in FIG. 1) that substantially support and/or maintain the spacing between the current collectors and/or the separator 130. In other embodiments, a current collector can be substantially corrugated and be configured to support the separator 130. In some embodiments, the anode cell 111 and/or the cathode cell 121 can include other support structures such as, for example, posts or ridges. The support structures can be an independent element or elements, attached to or integral to the current collector, or attached to or integral to the separator. In some embodiments, the support structures can be electrically conductive and in addition to mechanically supporting the separator 130, the support structures can enhance the electrode conductivity, which leads to improved cell performance. In some embodiments, the support structures can be thermally conductive and are configured to facilitate more effective heat transfer and thermal management of the cell. In some embodiments, the use of support structure can substantially limit deflection of, and/or spacing between, the separator 130 and/or the current collectors to within a given tolerance (e.g., +/−1%, +/−2%, +/−3%, +/−4%, +/−5%, or any other suitable tolerance).

The anode cell 111 includes a port 112 configured to receive a portion of a first injection tool 140 such that the anode compartment can receive the anolyte. Similarly, the cathode cell 121 includes a port. 122 configured to receive a portion of a second injection tool 140 (e.g., similar or the same as the first injection tool 140) such that the cathode compartment can receive the catholyte. While shown as being substantially circular, the anode port 112 and the cathode port 122 can be any suitable shape, size, or configuration. For example, in some embodiments, an anode cell and/or a cathode cell can include a port that is oriented along an edge of the cell. Furthermore, while shown as being at different locations along the length of the cell, the anode port 112 and the cathode port 122 can be positioned at substantially the same location along the edge of the cell.

The anolyte and catholyte can be introduced into the anode compartment and the cathode compartment, prior to the battery cell 110 being sealed. The anolyte and the catholyte can be, for example, flowable semi-solids or condensed liquid compositions. For example, the anolyte can be a semi-solid suspension of anode particulates and electronically conductive particles. Similarly, the catholyte can be a semi-solid suspension of cathode particulates and electronically conductive particles. The anolyte and the catholyte can be introduced into the anode compartment and the cathode compartment, respectively, using any suitable method. For example, the first injection tool 140 and the second injection tool 140 can each initiate a flow of anolyte and the catholyte, respectively, into the compartments. The injection tools 140 can be any suitable devices. For example, the injection tools 140 are syringes configured to apply a pressure on at least a portion of the anolyte and catholyte, respectively, to facilitate a flow of the flowable semi-solids. Expanding further, in some embodiments, the injection tools 140 can be actuated by a user supplied force, a machine supplied force (e.g., a machine driven plunger), a gravitational force, a centrifugal force, or the like.

In some embodiments, the injection tools 140 can be intracell injection nozzles. In such embodiments, the injection nozzle can have a geometry that substantially corresponds to a geometry of, for example, the anode compartment or the cathode compartment. For example, in some embodiments, the injection nozzle is a set of tubes that have been coupled together such that an overall dimension of the set of tubes substantially corresponds to a geometry of a compartment. In other embodiments, the injection nozzle can have a geometry that substantially corresponds to a geometry of the compartment while defining a single opening.

In embodiments wherein the injection tool 140 is an intracell injection nozzle, at least a portion of the injection nozzles can be inserted through the port 112 of the anode cell 111 and/or through the port 122 of the cathode cell 121 to be movably disposed within the anode compartment and/or the cathode compartment, respectively. The injection nozzles can be configured to be movable between a first position and a second position such that a desired pressure is maintained within the compartment or compartments during the introduction of the slurry (e.g., the anolyte or the catholyte. The injection nozzle can further be in fluid communication with a slurry reservoir (e.g., a syringe or the like) to deliver a flow of the slurry. In some embodiments, the intracell injection nozzle can be thermally controlled to facilitate the flow and retention of compositional homogeneity of the slurry. In some embodiments, multiple banks of injection nozzles can be similarly disposed within adjacent electrochemical cells such that the pressure within a first electrochemical cell is balanced by a pressure within a second electrochemical cell.

In some embodiments, the injection tool 140 is an extruding device. In such embodiments, an electrode slurry can be extruded through an extrusion slot such that the extruded slurry has a geometry that substantially corresponds to the anode compartment and/or the cathode compartment. In this manner, the extruded slurry can be transferred to the electrode compartments. In some embodiments, an electrolyte can be transferred to the electrode compartment (e.g., via a secondary injection tool not shown in FIG. 1). In such embodiments, the extruded slurry and the electrolyte can form a substantially uniform suspension within the electrode compartment.

In some embodiments, the injection tool(s) 140 can be a dry feeder (e.g., a hopper, a volumetric screw feeder, a gravimetric screw feeder, or the like). In such embodiments, the dry feeder can be configured to transfer an electrode material in powdered form to the electrode cell. In some embodiments, the electrode cell (e.g., the anode cell 111 and/or the cathode cell 121) can be placed in fluid communication with an electrolyte reservoir that contains an electrolyte at a substantially higher temperature, i.e. in a gas phase, than a temperature within the electrode cell, which may be maintained at a cooler temperature. In this manner, a portion of the electrolyte can condense from a gas phase into a liquid phase within the electrode chamber such that the powdered electrode and the electrolyte can mix. In some embodiments, the electrode cell can be disposed (e.g., at least partially) within an electrolyte vapor-containing environment.

In some embodiments, the transferring of the flowable semi-solids (anolyte and/or catholyte) can be assisted by mechanical vibration, sonic agitation, gravitational force, or shearing. The flow assistance can occur before, during, or after the transfer of the electrode materials into the compartments to decrease viscosity, promote suspension stability, overcome and/or augment forces inducing flow, and maintain an activated carbon network. In some embodiments, vibration and/or sonication can be used continuously during a fill process. In other embodiments, vibration and/or sonication can be used intermittently during a fill process. For example, vibration and/or sonication can be used after a given portion of an electrode slurry is transferred to a compartment. In some embodiments, the vibration and/or sonication process can be utilized serially after multiple portions of the slurry are transferred to the cavity.

In some embodiments, a vacuum can be applied to a portion of an electrode compartment. The vacuum can apply a suction force within the electrode compartment such that an electrode slurry is drawn into the electrode compartment. For example, the electrode slurry can be delivered to a first end portion of the electrode compartment (e.g., the anode compartment 111 and/or the cathode compartment 121) by the injection tool 140 using any of the methods described above and a vacuum can be applied at a second end portion of the electrode compartment such that the vacuum applies a complimentary force. In some embodiments, a vacuum assist technique can include recycling a drawn portion of the slurry back to the injection tool 140. In some embodiments, an electrolyte can be added during and/or after the fill process (e.g., a fill process including a vacuum assist) to substantially offset losses of electrolyte through electrolyte evaporation. In some embodiments, the electrode compartment can be evacuated and then with the vacuum disconnected or turned off, the slurry can be drawn into the evacuated compartment.

In some embodiments, it can be desirable to fill the anode cell 111 and the cathode cell 121 simultaneously and at a similar flow rate. In such embodiments, the concurrent transfer of the anolyte to the anode compartment and the catholyte to the cathode compartment can be such that the force on the separator and/or current collectors produced by the introduction of the anolyte into the anode compartment balances the force on the separator produced by the introduction of the catholyte into the cathode compartment, thus minimizing deflection of the separator 130. Said another way, when filling adjacent compartments that are divided by a relatively thin, deformable member, I can be desirable to fill adjacent compartments such that deformation of the relatively thin member is minimized. In other embodiments, it can be desirable to only fill an anode compartment or a cathode compartment.

Once loaded, the anode cell 111 and the cathode cell 121 can be sealed (as discussed in greater detail below) and the anode cell 111 and the cathode cell 121 can be operated in physical isolation, but electrical connection (e.g., similarly to known configurations). This arrangement allows a battery (e.g., multiple battery cells 110 in electrical connection) to adopt various form factors such that the battery can be constructed into specialized shapes and sizes for particular applications. The shape and design of the anode cell ill and the cathode cell 121 determines that of the resulting battery.

The use of varying electrode material (e.g., semi-solid constituents, separators, and/or cavity volumes) determines the battery's power and energy capabilities.

In some embodiments, the anode and/or cathode particles have an effective diameter of at least 1 µm. In some embodiments, the cathode and/or anode particles have an effective diameter between approximately 1 µm and approximately 10 µm. In other embodiments, the cathode and/or anode particles have an effective diameter of at least 10 µm or more.

In some embodiments, in order to increase the particle packing density and therefore the energy density of the semi-solid suspension, white still maintaining a flowable semi-solid, the ion storage compound particles have a polydisperse size distribution in which the finest particles present in at least 5 vol % of the total volume, is at least a factor of 5 smaller than the largest particles present in at least 5 vol % of the total volume. In some embodiments, in order to increase the particle packing density and therefore the energy density of the semi-solid suspension, while still maintaining a flowable semi-solid, the ion storage compound particles have a bidisperse size distribution (i.e., with two maxima in the distribution of particle number versus particle size) in which the two maxima differ in size by at least a factor of 5.

In some embodiments, the size distribution of ion storage compound particles in the semi-solid is polydisperse, and the particle packing fraction is at least 50 vol %. In some embodiments, the particle packing fraction is between approximately 50 vol % and 70 vol %. In other embodiments, the particle packing fraction is at least 70 vol % or more.

In some embodiments, the particles have morphology that is at least equiaxed, and spherical, in order to increase the flowability and decrease the viscosity of the semi-solid suspension while simultaneously achieving high particle packing density. In some embodiments, the spherical particles are dense, and in other embodiments the spherical particles are porous. In some embodiments, the spherical particles are made by spray-drying a particle suspension to obtain spherical agglomerates of smaller particles.

In some embodiments, the particles of ion storage material used in the semi-solid suspension are sufficiently large that surface forces do not prohibit them from achieving high tap density while dry, and high packing density when formulated into a semi-solid suspension. In some embodiments, the particle size is at least 1 µm. In other embodiments, the particle size is between approximately 1 µm and approximately 10 µm. In other embodiments, the particle size is at least 10 µm or more.

In some embodiments, high particle packing density is achieved simultaneously with flowability and low viscosity by using dispersants and surfactants well-known to those skilled in the arts of ceramics processing and colloid chemistry. These additives may be, for example, organic molecules having a $C_6$ to $C_{12}$ backbone used to provide steric forces when adsorbed on the particles. Examples of such additives include stearic acid, and the commercially available surfactant Triton-X-100.

In some embodiments, a redox mediator is used to improve charge transfer within the semi-solid suspension. In some embodiments, the redox mediator is based on $Fe^{2+}$ or $V^{2+}$, $V^{3+}$, or $V^{4+}$. In one embodiment, the redox mediator is ferrocene.

In some embodiments, dissolved redox ions can be used, as in a conventional aqueous or non-aqueous flow battery, but in such embodiments, the anolyte and/or catholyte has an increased solubility for such ions by using an ionic liquid as the solvent. In some embodiments, the redox chemistry is Fe—Cr, vanadium redox, or a zinc-halogen chemistry.

In some embodiments, the conductive particles have shapes, which may include spheres, platelets, or rods to optimize solids packing fraction, increase the semi-solid's net electronic conductivity, and improve rheological behavior of the semi-solids. Low aspect or substantially equiaxed particles tend to flow well, however, they tend to have a low packing density.

In some embodiments, the particles have a plurality of sizes so as to increase packing fraction by placing smaller particles in the interstices of the larger particles. In particular, the particle size distribution can be bimodal, in which the average particle size of the larger particle mode is at least 5 times larger than the average particle size of the smaller particle mode. The mixture of large and small particles improves flow of the material during cell loading and increases solid volume fraction and packing density in the loaded cell.

In some embodiments, the nature of suspension can be modified prior to and subsequent to injection of the semi-solid into the unfilled-battery-subassembly receptacles in order to facilitate flow during loading and packing density in the loaded cell.

In some embodiments, the particle suspension is initially stabilized by repulsive interparticle steric forces that arise from surfactant molecules. After the particle suspension is injected into the unfilled-battery-subassembly receptacles, chemical or heat treatments can cause these surface molecules to collapse or evaporate and promote densification. In some embodiments, the suspension's steric forces are modified intermittently during injection.

For example, the particle suspension can be initially stabilized by repulsive interparticle electrostatic double layer forces to decrease viscosity. The repulsive force reduces interparticle attraction and reduces agglomeration. After the particle suspension is injected into the unfilled-battery-subassembly receptacles, the surface of the particles can be further modified to reduce interparticle repulsive forces and thereby promote particle attraction and packing. For example, ionic solutions such as salt solutions can be added to the suspension to reduce the repulsive forces and promote aggregation and densification so as to produce increased solids fraction loading after injection. In some embodiments, salt is added intermittently during suspension injection to increase density in incremental layers.

In some embodiments, the cell compartments are loaded with a particle suspension that is stabilized by repulsive forces between particles induced by an electrostatic double layer or short-range steric forces due to added surfactants or dispersants. Following loading, the particle suspension is aggregated and densified by increasing the salt concentration of the suspension. In some embodiments, the salt that is added is a salt of a working ion for the battery (e.g., a lithium salt for a lithium ion battery) and upon being added, causes the liquid phase to become an ion-conducting electrolyte. The liquid phase comprises a solvent that is then used as the solvent component of the electrolyte (e.g., for a lithium rechargeable battery, may be one or more alkyl carbonates, or one or more ionic liquids). Upon increasing the salt concentration, the electrical double layer causing repulsion between the particles is "collapsed," and attractive interactions cause the particles to floc, aggregate, consolidate, or otherwise densify. This allows the electrode of the battery to be formed from the suspension while it has a low viscosity, for instance by pouring, injecting, or pumping into the chamber that forms a net-shaped electrode, and then allows particles within the suspension to be consolidated for improved electrical conduction, higher packing density, and longer service life.

In some embodiments, the injectable and flowable semi-solid is caused to become non-flowable by "fixing." In some embodiments, fixing is performed by action of photo-polymerization. In some embodiments, fixing is performed by action of electromagnetic radiation with wavelengths that are transmitted by the unfilled-battery-subassembly. In some specific embodiments, one or more additives are added to the flowable semi-solid to facilitate the fixing of the flowable semi-solid.

In some embodiments, the injectable and flowable semi-solid is caused to become non-flowable by "plasticizing." In some embodiments, the rheological properties of the injectable and flowable semi-solid are modified by addition of a thinner, a thickener, or a plasticizing agent. In some specific embodiments, these agents promote processability and help retain compositional uniformity of the semi-solid under flowing conditions and compartment filling operations. In some specific embodiments, one or more additives are added to the flowable semi-solid to adjust its flow properties to accommodate processing requirements.

Semi-Solid Composition

In some embodiments, the anolyte and catholyte semi-solids provide a means to produce a substance that functions collectively as an ion-storage/ion-source, electron conductor, and ionic conductor in a single medium that acts as a working electrode.

Any anolyte and/or catholyte semi-solid ion-storing redox composition as described herein can have, when taken in moles per liter (molarity), at least 10M concentration of redox species. In some embodiments, any anolyte and/or catholyte semi-solids ion-storing redox composition can have at least 12M, at least 15M, or at least 20M. The electrochemically active material can be an ion storage material or any other compound or ion complex that is capable of undergoing Faradaic reaction in order to store energy. The electroactive material can also be a multiphase material including the above-described redox-active solid mixed with a non-redox-active phase, including solid-liquid suspensions, or liquid-liquid multiphase mixtures, including micelles or emulsions having a liquid ion-storage material intimately mixed with a supporting liquid phase. Systems that utilize various working ions can include aqueous systems in which or $OH^-$ are the working ions, non-aqueous systems in which $Li^+$, $Na^+$, or other alkali ions are the working ions, even alkaline earth working ions such as $Ca^{2+}$ and $Mg^{2+}$, or $Al^{3+}$. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

Systems employing both negative and positive ion-storage materials are particularly advantageous because there are no additional electrochemical byproducts in the cell. Both the positive and negative electrodes materials are insoluble in the flow electrolyte and the electrolyte does not become contaminated with electrochemical composition products that must be removed and regenerated. In addition, systems employing both negative and positive lithium ion-storage materials are particularly advantageous when using non-aqueous electrochemical compositions.

In some embodiments, the semi-solid ion-storing redox compositions include materials proven to work in conventional, solid lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte.

In some embodiments at least one of the energy storage electrodes includes a condensed ion-storing liquid of a redox-active compound, which may be organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that are liquid under the operating conditions of the battery. Such a liquid form may also be diluted by or mixed with another, non-redox-active liquid that is a diluent or solvent, including mixing with such diluents to form a lower-melting liquid phase. However, unlike a conventional flow cell catholyte or anolyte, the redox-active component will comprise, by mass, at least 10% of the total mass of the flowable electrolyte. In other embodiments, the redox-active component will comprise, by mass, between approximately 10% and 25% of the total mass of the flowable electrolyte. In other embodiments, the redox-active component will comprise, by mass, at least 25% or more of the total mass of the flowable electrolyte.

In some embodiments, the redox-active electrode material, whether used as a semi-solid or a condensed liquid format as defined above, comprises an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., *Electrochim. Acta*, 50, 827-831, (2004), and K. Nakahara, et al., *Chem. Phys. Leu.*, 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials*, DOI: 10.1038/nmat2372) and organosulfur compounds.

In some embodiments, organic redox compounds that are electronically insulating are used. In some instance, the redox compounds are in a condensed liquid phase such as liquid or flowable polymers that are electronically insulating. In such cases, the redox active slurry may or may not contain an additional carrier liquid. Additives can be combined with the condensed phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes. The conductive additives form an electrically conducting framework within the insulating liquid redox compounds that significantly increases the electrically conductivity of the composition. In some embodiments, the conductive addition forms a percolative pathway to the current collector.

In some embodiments the redox-active electrode material comprises a sol or gel, including for example metal oxide sols or gels produced by the hydrolysis of metal alkoxides, amongst other methods generally known as "sol-gel processing." Vanadium oxide gels of composition $V_xO_y$ are amongst such redox-active sol-gel materials.

Other suitable positive active materials include solid compounds known to those skilled in the art as those used in NiMH (Nickel-Metal Hydride) Nickel Cadmium (NiCd) batteries. Still other positive electrode compounds for Li storage include those used in carbon monofluoride batteries, generally referred to as CFx, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

As another example, fullerenic carbon including single-wall carbon nanotubes (SWNTs), multiwall carbon nanotubes (MWNTs), or metal or metalloid nanowires may be used as ion-storage materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi: 10.1038/nnano.2007.411.

Exemplary electroactive materials for the positive electrode in a lithium system include the general family of ordered rocksalt compounds $LiMO_2$ including those having the α-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC"). Other families of exemplary electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In one or more embodiments the active material comprises a transition metal polyanion compound, for example as described in U.S. Pat. No. 7,338,734. In one or more embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1-a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)_z(A_{1-a}M''_a)_x$ $M'_y(X_2D_7)_z$, and have values such that (1-a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments the redox-active electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the firm of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a nonaqueous or aqueous lithium system.

In some embodiments, the working ion is selected from the group consisting of $Li^+$, $Na^+$, $H^+$, $Mg^{2+}$, $Al^{3+}$, or $Ca^{2+}$.

In some embodiments, the working ion is selected from the group consisting of $Li^+$ or $Na^+$.

In some embodiments, the flowable semi-solid ion-storing redox composition includes a solid including an ion storage compound.

In some embodiments, the ion is proton or hydroxyl ion and the ion storage compound includes those used in a nickel-cadmium or nickel metal hydride battery.

In some embodiments, the ion is lithium and the ion storage compound is selected from the group consisting of metal fluorides such as $CuF_2$, $FeF_2$, $FeF_3$, $BiF_3$, $CoF_2$, and $NiF_2$.

In some embodiments, the ion is lithium and the ion storage compound is selected from the group consisting of metal oxides such as CoO, $Co_3O_4$, NiO, CuO, MnO.

In some embodiments, the ion is lithium and the ion storage compound includes an intercalation compound selected from compounds with formula $Li_{1-x-z}M_{1-z}PO_4$, wherein M includes at least one first row transition metal selected from the group consisting of Ti, V, Cr, Mn, Fe, Co and Ni, wherein x is from 0 to 1 and z can be positive or negative.

In some embodiments, the ion is lithium and the ion storage compound includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1-a) times a formal valence or valences of M', plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $A_{1-a}M''_a)_xM'_y(XD_4)_z$, $(A_{1-a}M''_a)_xM'_y(DXD_4)z$ and $A_{1-a}M''_a)_xM'_y(X_2D_7)_z$, where (1-a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the α-$NaFeO_2$ and orthorhombic- $LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg, or Zr.

In some embodiments, the flowable semi-solid ion-storing redox composition includes a solid including amorphous carbon, disordered carbon, graphitic carbon, or a metal-coated or metal-decorated carbon.

In some embodiments, the flowable semi-solid ion-storing redox composition includes a solid including a metal or metal alloy or metalloid or metalloid alloy or silicon.

In some embodiments, the flowable semi-solid ion-storing redox composition includes a solid including nanostructures including nanowires, nanorods, and nanotetrapods.

In some embodiments, the flowable semi-solid ion-storing redox composition includes a solid including an organic redox compound.

In some embodiments, the positive electrode includes a flowable semi-solid ion-storing redox composition including a solid selected from the group consisting of ordered rocksalt compounds $LiMO_2$ including those having the α-$NaFeO_2$ and orthorhombic- $LiMnO_2$ structure type or their derivatives of different crystal symmetry, atomic ordering, or partial substitution for the metals or oxygen, wherein M includes at least one first-row transition metal but may include non-transition metals including but not limited to Al, Ca, Mg, or Zr and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a solid selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, and where x, plus y(1-a) times a formal valence or valences of M', plus ya times a formal valence or valence of M", is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a compound with a spinel structure.

In some embodiments, the positive electrode includes a flowable semi-solid ion-storing redox composition including a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. Li/Li+ that exceeds 4.3V including but not limited to LiNi0.5Mn1.5O4; olivines LiMPO$_4$ and their derivatives, in which M includes one or more of Mn, Fe, Co, or Ni, partially fluorinated compounds such as LiVPO$_4$F, other "polyanion" compounds, and vanadium oxides V$_x$O$_y$, including V$_2$O$_5$ and V$_6$O$_{11}$.

In some embodiments the semi-solid flow battery is a lithium battery, and the negative electrode active compound comprises graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

Exemplary electroactive materials for the negative electrode in the case of a lithium working ion include graphitic or non-graphitic carbon, amorphous carbon, or mesocarbon microbeads; an unlithiated metal or metal alloy, such as metals including one or more of Ag, Al, Au, B, Ga, Ge, In, Sb, Sn, Si, or Zn, or a lithiated metal or metal alloy including such compounds as LiAl, Li$_9$Al$_4$, Li$_3$Al, LiZn, LiAg, Li$_{10}$Ag$_3$, Li$_5$B$_4$, Li$_7$B$_6$, Li$_{12}$Si$_7$, Li$_{21}$Si$_8$, Li$_{13}$Si$_4$, Li$_{21}$Si$_5$, Li$_5$Sn$_2$, Li$_{13}$Sn$_5$, Li$_7$Sn$_2$, Li$_{22}$Sn$_5$, Li$_2$Sb, Li$_3$Sb, LiBi, or Li$_3$Bi, or amorphous metal alloys of lithiated or non-lithiated compositions.

In some embodiments, the negative electrode includes a semi-solid ion-storing redox composition including graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

The current collector is electronically conductive and should be electrochemically inactive under the operation conditions of the cell. Typical current collectors for lithium cells include copper, aluminum, or titanium for the negative current collector and aluminum for the positive current collector, in the form of sheets or mesh, or any configuration for which the current collector may be distributed in the electrolyte and permit fluid flow. Selection of current collector materials is well-known to those skilled in the art. In some embodiments, aluminum is used as the current collector for positive electrode. In some embodiments, copper is used as the current collector for negative electrode. In other embodiments, aluminum is used as the current collector for negative electrode.

In some embodiments, the negative electrode can be a conventional stationary electrode, while the positive electrode includes a semi-solid redox composition. In other embodiments, the positive electrode can be a conventional stationary electrode, while the negative electrode includes a semi-solid redox composition.

Current collector materials can be selected to be stable at the operating potentials of the positive and negative electrodes of the flow battery. In non-aqueous lithium systems the positive current collector may comprise aluminum, or aluminum coated with conductive material that does not electrochemically dissolve at operating potentials of 2.5-5V with respect to Li/Li$^+$. Such materials include Pt, Au, Ni, conductive metal oxides such as vanadium oxide, and carbon. The negative current collector may comprise copper or other metals that do not form alloys or intermetallic compounds with lithium, carbon, and coatings comprising such materials on another conductor.

In some embodiments, the electrochemical function of the semi-solids redox cell is improved by mixing or blending the anode or cathode particles with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments. In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes).). In some embodiments, the resulting catholyte or anolyte mixture has an electronic conductivity of at least about $10^{-6}$ S/cm. In other embodiments, the mixture has an electronic conductivity between approximately $10^{-6}$ S/cm and $10^{-3}$ S/cm. In other embodiments, the mixture has an electronic conductivity of at least about $10^{-5}$ S/cm, or at least about $10^{-4}$ S/cm, of at least about $10^{-3}$ S/cm or more.

In some embodiments, the anodic or cathodic particles can be caused to have a partial or full conductive coating.

In some embodiments, the semi-solid ion-storing redox composition includes an ion-storing solid coated with a conductive coating material. In certain specific embodiments, the conductive coating material has higher electron conductivity than the solid. In certain specific embodiments, the solid is graphite and the conductive coating material is a metal, metal carbide, metal oxide, metal nitride, or carbon. In certain specific embodiments, the metal is copper.

In some embodiments, the solid of the semi-solid ion-storing material is coated with metal that is redox-inert at the operating conditions of the redox energy storage device. In some embodiments, the solid of the semi-solid ion-storing material is coated with copper to increase the conductivity of the storage material particle, to increase the net conductivity of the semi-solid, and/or to facilitate charge transfer between energy storage particles and conductive additives. In some embodiments, the storage material particle is coated with, about 1.5% by weight, metallic copper. In some embodiments, the storage material particle is coated with, about 3.0% by weight, metallic copper. In some embodiments, the storage material particle is coated with, about 8.5% by weight, metallic copper. In some embodiments, the storage material particle is coated with, about 10.0% by weight, metallic copper. In some embodiments, the storage material particle is coated with, about 15.0% by weight, metallic copper. In some embodiments, the storage material particle is coated with, about 20.0% by weight, metallic copper.

In some embodiments, the conductive coating is placed on the anodic or cathodic particles by chemical precipitation of the conductive element and subsequent drying and/or calcination.

In some embodiments, the conductive coating is placed on the anodic or cathodic particles by electroplating (e.g., within a fluidized bed).

In some embodiments, the conductive coating is placed on the anodic or cathodic particles by co-sintering with a conductive compound and subsequent comminution.

In some embodiments, the electrochemically active particles have a continuous intraparticle conductive material or are embedded in a conductive matrix.

In some embodiments, a conductive coating and intraparticulate conductive network is produced by multicomponent-spray-drying a semi-solid of anode/cathode particles and conductive material particulates.

In some embodiments, conductive polymers are among the components semi-solid and provide an electronically conductive element. In some embodiments, the conductive polymers are one or more of: polyacetylene, polyaniline, polythiophene, polypyrrole, poly(p-phenylene), poly(triphenylene), polyazulene, polyfluorene, polynaphtalene, polyanthracene, polyfuran, polycarbazole, polyacenes, poly(heteroacenes). In some embodiments, the conductive polymer is a compound that reacts in-situ to form a conductive polymer on the surface of active materials particles. In one embodiment, the compound is 2-hexylthiophene or 3-hexylthiophene and oxidizes during charging of the battery to form a conductive polymer coating on solid particles in the cathode semi-solid suspension. In other embodiments, redox active material can be embedded in conductive matrix. The redox active material can coat the exterior and interior interfaces in a flocculated or agglomerated particulate of conductive material. In other embodiments, the redox-active material and the conductive material can be two components of a composite particulate. Without being bound by any theory or mode of operation, such coatings can pacify the redox active particles and can help prevent undesirable reactions with carrier liquid or electrolyte. As such, it can serve as a synthetic solid-electrolyte interphase (SEI) layer.

In some embodiments, inexpensive iron compounds such as pyrite ($FeS_2$) are used as inherently electronically conductive ion storage compounds. In one embodiment, the ion that is stored is Li+.

In some embodiments, redox mediators are added to the semi-solid to improve the rate of charge transfer within the semi-solid electrode. In some embodiments, this redox mediator is ferrocene or a ferrocene-containing polymer. In some embodiments, the redox mediator is one or more of tetrathiafulvalene-substituted polystyrene, ferrocene-substituted polyethylene, carbazole-substituted polyethylene.

In some embodiments, the surface conductivity or charge-transfer resistance of current collectors used in the semi-solid battery is increased by coating the current collector surface with a conductive material. Such layers can also serve as a synthetic SEI layer. Non-limiting examples of conductive-coating material include carbon, a metal, metal carbide, metal nitride, metal oxide, or conductive polymer. In some embodiments, the conductive polymer includes but is not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes). In some embodiments, the conductive polymer is a compound that reacts in-situ to form a conductive polymer on the surface of the current collector. In one embodiment, the compound is 2-hexylthiophene and oxidizes at a high potential to form a conductive polymer coating on the current collector. In some embodiments, the current collector is coated with metal that is redox-inert at the operating conditions of the redox energy storage device.

The semi-solid redox compositions can include various additives to improve the performance of the redox cell. The liquid phase of the semi-solids in such instances would comprise a solvent, in which is dissolved an electrolyte salt, and binders, thickeners, or other additives added to improve stability, reduce gas formation, improve SEI formation on the negative electrode particles, and the like. Examples of such additives include vinylene carbonate (VC), vinylethylene carbonate (VEC), fluoroethylene carbonate (FEC), or alkyl cinnamates, to provide a stable passivation layer on the anode or thin passivation layer on the oxide cathode; propane sultone (PS), propene sultone (PrS), or ethylene thiocarbonate as antigassing agents; biphenyl (BP), cyclohexylbenzene, or partially hydrogenated terphenyls, as gassing/safety/cathode polymerization agents; or lithium bis (oxatlato)borate as an anode passivation agent.

In some embodiments, the non-aqueous positive and negative electrode semi-solids redox compositions are prevented from absorbing impurity water and generating acid (such as HF in the case of $LiPF_6$ salt) by incorporating compounds that getter water into the active material suspension or into the storage tanks or other plumbing of the system. Optionally, the additives are basic oxides that neutralize the acid. Such compounds include but are not limited to silica gel, calcium sulfate (for example, the product known as Drierite), aluminum oxide and aluminum hydroxide.

EXAMPLE 1

Semi-solid Filled Cell Using Lithium Metal Oxides for Electrode Materials

Preparation of a Non-aqueous Lithium Titanate Spinel Anode Semi-solid:

A suspension containing 8% by volume of lithium titanium oxide ($Li_4Ti_5O_{12}$) and 8% by volume carbon black as the conductive additive in 84% by volume of a non-aqueous electrolyte consisting of $LiPF_6$ in a mixture of alkyl carbonates was prepared by first mixing 0.7 g $Li_4Ti_5O_{12}$ and 0.44 g of carbon black in the dry state using a TURBULA shaker-mixer for 1 hr. 2.5 ml of the electrolyte was then added and the mixture was sonicated for 1 hr.

Preparation of a Non-aqueous Lithium Cobalt Oxide Cathode Semi-solid:

Suspensions containing 12% by volume of lithium cobalt oxide ($LiCoO_2$), 8% by volume of carbon black, and the balance being an electrolyte consisting of $LiPF_6$ in a mixture of alkyl carbonates, were prepared. 1.05 g of lithium cobalt oxide was mixed with 0.22 g of the carbon using a turbula mixture for 1 hr. Afterwards, the electrolyte was added in the appropriate amount to make up the balance of the semi-solid suspension, and mixture was sonicated for 1 hr.

Some embodiments described herein relate to a semi-solid suspension with greater than about 45% active material by volume. Additionally, in some embodiments, a sufficient quantity of a conductive additive (e.g., carbon black) can be added to the slurry to improve electrical conductivity and electrochemical performance of the electrode. Furthermore, some embodiments described herein relate to a repeatable, scalable, manufacturing-oriented formulation process.

In some embodiments, an electrochemically active semi-solid suspension can include about 20% to about 75% by volume of a cathode or anode ion storage component, about 0.5% to about 25% by volume of a conductive additive component, and about 25% to about 70% by volume of an electrolyte.

In some embodiments, slurry components can be mixed in a batch process (e.g., with a batch mixer), with a specific spatial and/or temporal ordering of component addition, as described in more detail herein. In some embodiments, slurry components can be mixed in a continuous process (e.g. in an extruder), with a specific spatial and/or temporal ordering of component addition.

In some embodiments, process conditions (temperature; shear rate or rate schedule; component addition sequencing, location, and rate; mixing or residence time) can be selected and/or modified to control the electrical, rheological, and/or compositional (e.g., uniformity) properties of the prepared slurry. In some embodiments, the mixing element (e.g., roller blade edge) velocity is between about 0.5 cm/s and about 50 cm/s. In some embodiments, the minimum gap between which fluid is being flowed in the mixing event (e.g. distance from roller blade edge to mixer containment wall) is between about 0.05 mm and about 5 mm. Therefore, the shear rate (velocity scale divided by length scale) is accordingly between about 1 and about 10,000 inverse seconds. In some embodiments, the shear rate can be less than 1 inverse second, and in other embodiments, the shear rate is greater than 10,000 inverse seconds.

For example, the process conditions can be selected to produce a prepared slurry having a mixing index of at least about 0.80, at least about 0.90, at least about 0.95, or at least about 0.975. In some embodiments, the process conditions can be selected to produce a prepared slurry having an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent sheer rate of 1,000 $s^{-1}$. In some embodiments, the process conditions can be selected to produce a prepared slurry having two or more properties as described herein.

The mixing and forming of a slurry electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

Raw material conveyance and/or feeding can include: batch based manual weighing of material with natural feeding (e.g., allowing the mixer to accept material into the mixture without external force), batch based manual weighing of material with forced feeding either by a piston mechanism or a screw-based "side stuffer," gravimetric screw solids feeders with natural feeding (e.g., feed at the rate which the mixer can naturally accept material), gravimetric screw solids feeders with forced feeding (e.g., units sold by Brabender Industries Inc combined with a piston mechanism or a screw-based 'side stuffer'), and/or any other suitable conveyance and/or feeding methods and/or any suitable combination thereof.

In some embodiments, the slurry can be mixed using a Banburry® style batch mixer, a mixing section of a twin screw extruder, a centrifugal planetary mixer, and/or a planetary mixer. In some embodiments, the slurry can be sampled and/or monitored after mixing to measure and/or evaluate homogeneity, rheology, conductivity, viscosity, and/or density.

In some embodiments, for example after mixing, the slurry can be conveyed and/or pressurized, for example using a piston pump, peristaltic pump, gear/lobe pump, progressing cavity pump, single screw extruder, conveying section of a twin screw extruder, and/or any other suitable conveying device. In some embodiments, the torque and/or power of the conveying device, the pressure at the conveying device exit, the flow rate, and/or the temperature can be measured, monitored and/or controlled during the conveying and/or pressurizing.

In some embodiments, for example after conveying and/or pressurizing, the slurry can be dispensed and/or extruded. The slurry can be dispensed and/or extruded using, for example, a "hanger die" sheet extrusion die, a "winter manifold" sheet extrusion die, a profile-style sheet extrusion die, an arbitrary nozzle operable to apply a continuous stream of material to a substrate, injection into a mold of the correct size and shape (e.g., filling a pocket with material), and/or any other suitable dispensing device.

In some embodiments, after dispensing the slurry can be formed into a final electrode. For example, the slurry can be calendar roll formed, stamped and/or pressed, subjected to vibrational settling, and/or cut in discrete sections. Additionally, in some embodiments, unwanted portions of material can be removed (e.g., masking and cleaning) and optionally recycled back into the slurry manufacturing process.

The systems, mixing equipment, processes and methods described herein can be used to produce a semi-solid suspension (e.g., slurry) suitable for use in electrochemical devices (e.g., batteries). The semi-solid suspension produced by such systems and methods are suitable for the formulation of a slurry-based electrodes with particular properties, for example, rheology, conductivity, and electrochemical performance. For example, some suitable mixing devices include batch mixers (e.g., C. W. Brabender or Banburry® style), continuous compounding devices such as ported single or twin screw extruders (e.g., Leistritz, Haake), high shear mixers such as blade-style blenders, high speed kneading machines, and/or rotary impellers. In some embodiments, the mixing device can be operable to control the flowability of the slurry by regulating the temperature, and/or to control the slurry homogeneity by modulating the chemical composition.

In embodiments in which a batch mixer is used to mix the slurry, the slurry can be transferred from the batch mixer to another piece of processing equipment, e.g., an extruder. In such embodiments, the transfer method can be chosen so as to minimize electrolyte losses, to not appreciably disrupt the slurry state, and/or to not introduce other processing difficulties, such as entrainment of ambient gases. In embodiments in which an extruder (e.g., twin screw) is used to mix the slurry, mixing and material conveyance occur together, thus eliminating a process step.

In some embodiments, some electrolyte loss can be tolerated and used as a control specification, and the amount that can be tolerated generally decreases as electrolyte volume fraction increases and/or mixing index increases. For example, at a mixing index of 0.8, the maximum electrolyte loss can be controlled to less than about 39%, to less than about 33%, or to less than about 27%. At a mixing index of 0.9, the maximum electrolyte loss can be controlled to less than about 5%, to less than about 4%, or to less than about 3%. At mixing indices higher than 0.9, the maximum electrolyte loss can be controlled to less than about 5%, to less than about 4%, or to less than about 3%. Component concentrations can be calculated to determine and/or predict tolerable losses, and vary according to the specific components. In other embodiments, loss tolerances will be higher while in others they will be more restrictive.

In some embodiments, the composition of the slurry and the mixing process can be selected to homogeneously disperse the components of the slurry, achieve a percolating conductive network throughout the slurry and sufficiently high bulk electrical conductivity, which correlates to desirable electrochemical performance as described in further detail herein, to obtain a rheological state conducive to processing, which may include transfer, conveyance (e.g., extrusion), dispensing, segmenting or cutting, and post-dispense forming (e.g., press forming, rolling, calendering, etc.), or any combination thereof.

The systems and methods described below are examples of cell and module fabrication. While specific embodiments are discussed, it should be understood that more than one embodiment can be integrated to compose, for example, a hybrid embodiment. The systems and methods described below can be applied to half cells (e.g., an anode cell or a cathode cell), full cells (e.g., and anode cell and a cathode cell separated by an ion permeable membrane), or modules (e.g., multiple full cells). Any of the semi-solids (or portions thereof) described above can be used in any of the embodiments described below. Similarly, any of the methods of mixing described above can be used in conjunction with any of the embodiments described below.

Figure 2:
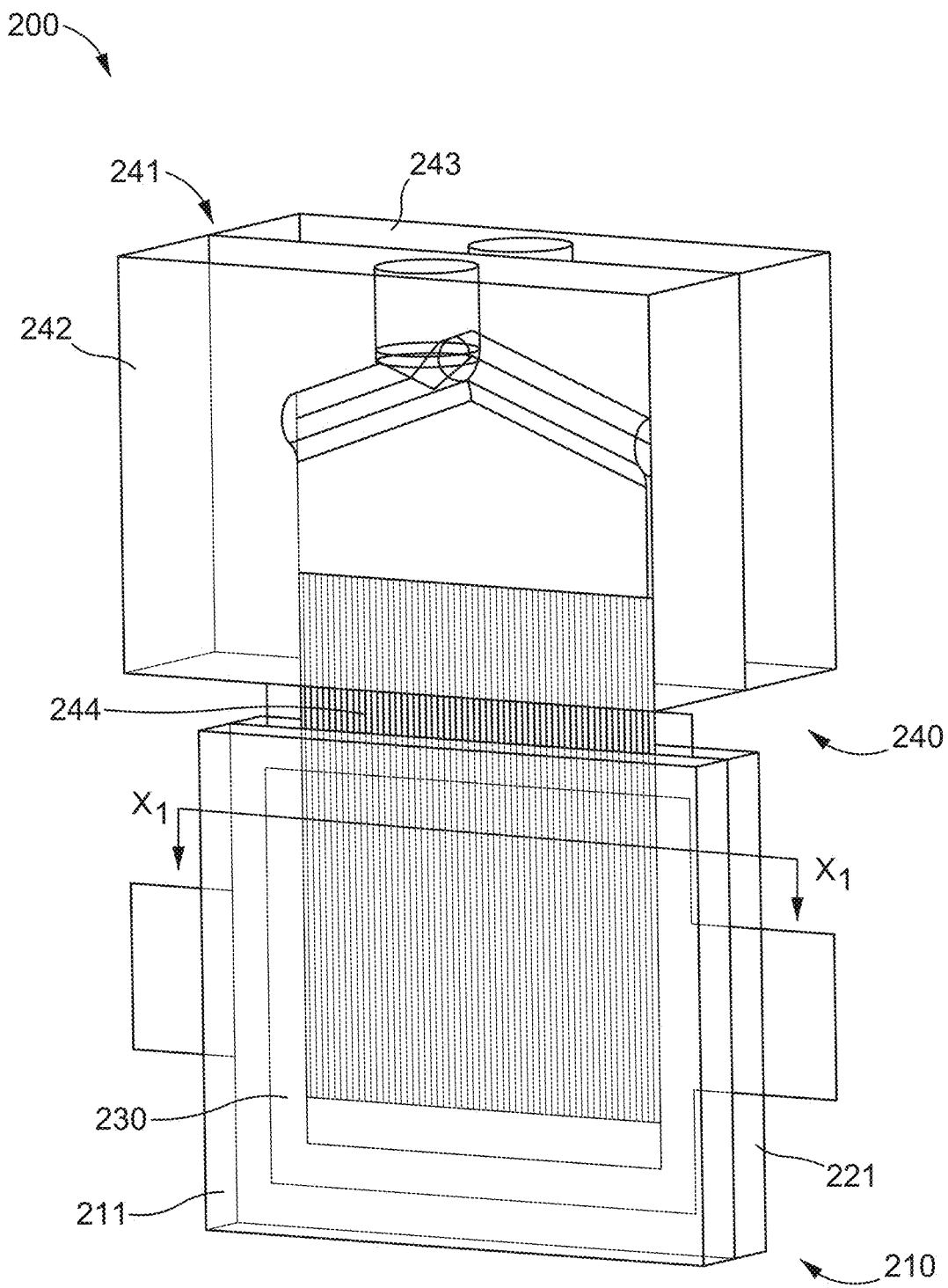
FIG. 2 illustrates a system for manufacturing an electrochemical cell, according to an embodiment.
Figure 3:
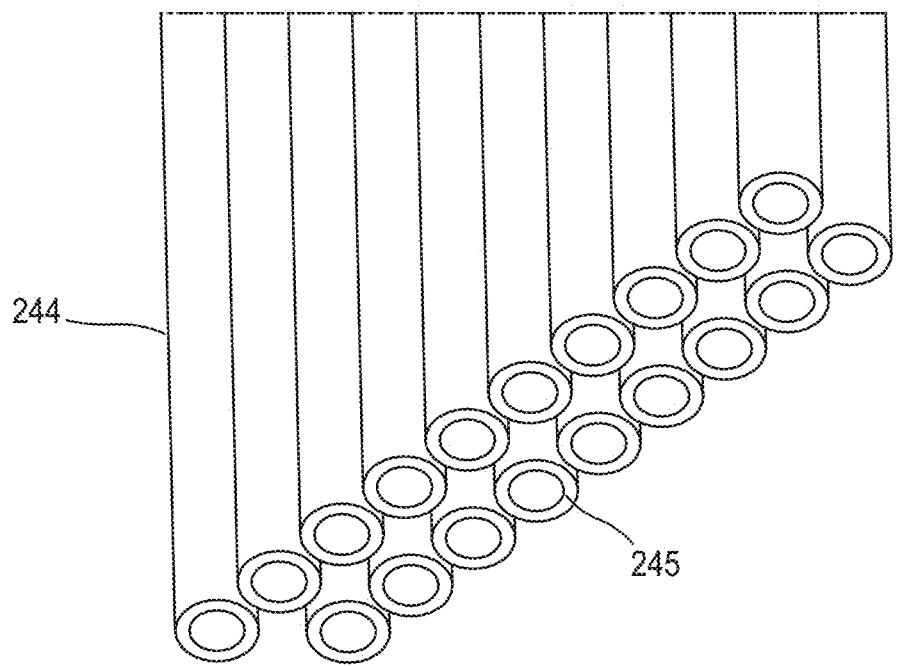
FIG. 3 is a perspective view of a portion of injection nozzles included in the system of FIG. 2.
Figure 4:
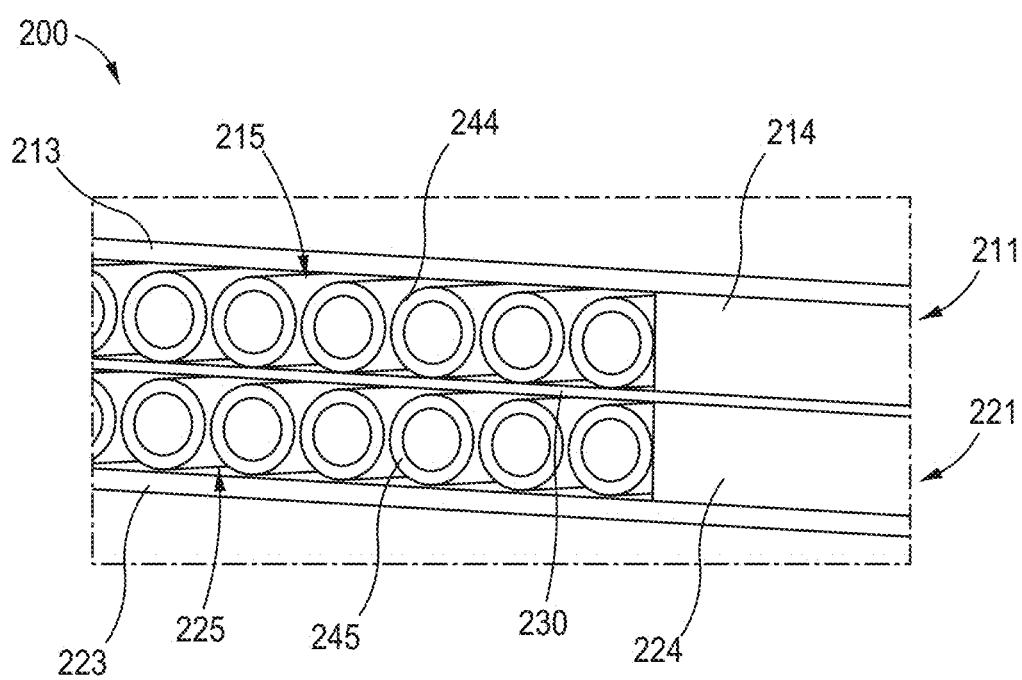
FIG. 4 is a cross-sectional view of a portion of the system of FIG. 2, taken along the like $X_1$-$X_1$.

FIGS. 2-4 show a system 200 illustrating a method of manufacturing an electrochemical cell, according to an embodiment. The system 200 includes a battery cell 210 and an injection tool 240. The battery cell 210 includes an anode cell 211, a cathode cell 221, and a separator 230 disposed therebetween. The anode cell 211 includes current collector 213, a frame 214, and a port 212, and defines a cavity 215. The frame 214 can be configured to provide structural support to the anode cell 211. The current collector 213 can be any of those described above. Therefore, the current collector 213 is not described in further detail herein. The cavity 215 is defined by the current collector 213, the frame 214, and the separator 230 (see e.g., FIG. 4). The port 212 is, at least temporarily (e.g., during manufacturing) in fluid communication with the cavity 215 such that the cavity 215 can receive a flow of an electrode slurry, as further described herein. The cathode cell 221 includes a current collector 223, a frame 224, and a port 222, and defines a cavity 215. The cathode cell 221 can be substantially similar in form to the anode cell 211. Therefore, the components of the cathode cell 221 are not described in further detail herein.

The injection tool 240 includes a manifold 241 having an anode portion 242 and a cathode portion 243. The anode portion 242 is physically and fluidically coupled to a set of anode injection nozzles 244 (see e.g., FIG. 3). Similarly, the cathode portion 243 is physically and fluidically coupled to a set of cathode injection nozzles 245 (see e.g., FIG. 3). The manifold 241 can be any suitable shape, size, or configuration and is configured to selectively transfer a flow of electrode material to the battery cell 210. In some embodiments, the manifold 241 can be at least operably coupled to any other suitable machinery (not shown) included in the system 200. For example, the manifold 241 can be operably coupled to a motor, a feeder, and injector tool (e.g., a syringe device), or the like. In this manner, the manifold 241 can receive a flow of an electrode material. More specifically, the system 200 can be configured to deliver an anode flowable semi-solid to the anode portion 242 of the manifold 241 and a cathode flowable semi-solid to the cathode portion 243.

At least a portion of the anode injection nozzles 244 and at least a portion of the cathode injection nozzles 245 can be movably disposed within the anode cavity 215 and the cathode cavity 225, respectively. As shown in FIG. 3, the anode injection nozzles 244 and the cathode injection nozzles 245 can be any number of relatively small tubes configured to be coupled together such that the overall shape of the injection nozzles 244 and 245 substantially correspond to a geometry of the anode cavity 215 and the cathode cavity 225, respectively. For example, in some embodiments, the anode injection nozzles 244 and the cathode injection nozzles 245 can be any number of tubes (e.g., needles) brazed together and machined into a desired form (e.g., corresponding to the anode cavity 215 and the cathode cavity 225, respectively). While shown in FIG. 3 as being formed from multiple tubes or conduits, in some embodiments, an anode injection nozzle 244 and/or a cathode injection nozzle 245 can be a monolithically formed structure defining, for example, a slotted channel.

Figure 5:
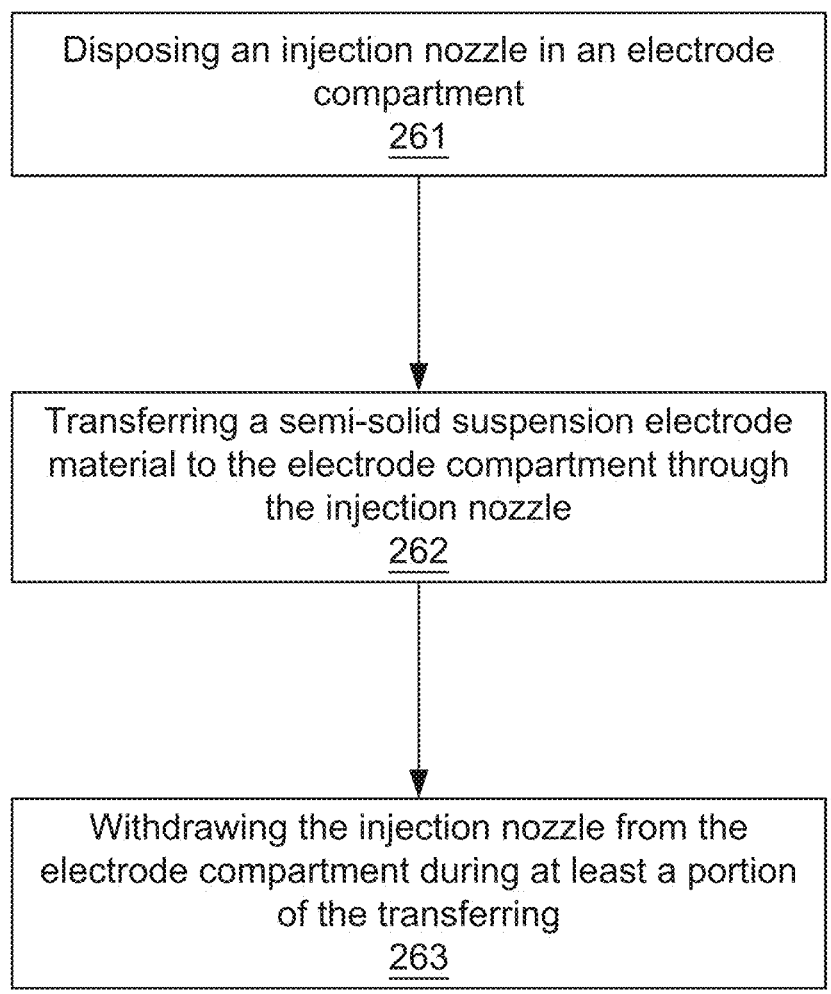
FIG. 5 is a flowchart illustrating a method of manufacturing the electrochemical cell illustrated in FIG. 2.

FIG. 5 is a flowchart illustrating a method 260 of manufacturing an electrochemical cell (e.g., the battery cell 210) utilizing the system 200. The method 260 includes disposing an injection nozzle in an electrode compartment, at 261. For example, in use with the system 200, the anode injection nozzle 244 and the cathode injection nozzle 245 can be disposed within the anode cavity 215 and the cathode cavity 225, respectively. More specifically, an end portion of the anode injection nozzle 244 can be disposed adjacent to an end portion of the anode cavity 215 (e.g., an end opposite the port 212) and an end portion of the cathode injection nozzle 245 can be disposed adjacent to an end portion of the cathode cavity (e.g., an end opposite the port 222).

The method 260 includes transferring a semi-solid suspension electrode material to the electrode compartment through the injection nozzle, at 262. For example, in the system 200, the anode portion 242 of the manifold 241 can receive a flow of an anode slurry (any of those described above) and the cathode portion 243 of the manifold 242 can receive a flow of a cathode slurry (any of those described above). The anode slurry and the cathode slurry can be delivered to the manifold 241 in any suitable manner. For example, in some embodiments, the anode slurry and the cathode slurry can be delivered from an anode reservoir and a cathode reservoir, respectively, to the manifold 241 via an applied pressure (e.g., mechanically applied force, user applied force, gravitational force, centrifugal force, or the like). In this manner, the anode slurry and the cathode slurry are placed under pressure such that the anode slurry and cathode slurry flow within the anode injection nozzle 244 and the cathode injection nozzle 245, respectively. Therefore, the anode injection nozzle 244 can deliver a flow of the anode slurry to the anode cavity 215 and the cathode injection nozzle 245 can deliver a flow of the cathode slurry to the cathode cavity 225.

The method 260 includes withdrawing the injection nozzle from the electrode compartment during at least a portion of the transferring, at 263. For example, during injection of the slurry, the anode injection nozzle 244 and the cathode injection nozzle 245 are configured to move within the anode cavity 215 and the cathode cavity 225, respectively, in the direction of the ports 212 and 222 (e.g., the nozzles are withdrawn from the cavities). In some embodiments, the injection nozzles 244 and 245 can be heated and/or vibrated (e.g., in a peristaltic motion) to facilitate the flow of the anode slurry and cathode slurry. In some embodiments, such as those including multiple tubes that are coupled to form the injection nozzles, various tubes can be configured to transfer various portions of the slurry (e.g., a given tube can transfer a sealant while a different tube can transfer a surfactant).

As the slurries are transferred to the anode cavity 215 and the cathode cavity 225, the pressure within the anode cavity 215 is configured to be in equilibrium with the pressure within the cathode cavity 225. Similarly stated, the anode slurry can be transferred to the anode cavity at a flow rate that is substantially equal to the flow rate of the cathode slurry being transferred to the cathode cavity such that the pressures within the anode cavity 215 and the cathode cavity 225 are substantially equal. In other embodiments, the flow rates of the anode slurry and the cathode slurry can substantially correspond to the density of the slurry. Thus, the pressures within the anode cavity 215 and the cathode cavity 225 can remain in equilibrium with differing flow rates when the anode slurry and the cathode slurry have differing densities. Furthermore, the geometry of the anode injection nozzle 244 and the geometry of the cathode injection nozzle 245 is such that the injection nozzles 244 and 245 substantially balance the pressure of a portion of the anode cavity 215 and cathode cavity 225 in which they are disposed.

With a desired amount of anode slurry and cathode slurry transferred to the anode cavity 215 and the cathode cavity 225, the anode injection nozzle 244 and the cathode injection nozzle 245 can be retracted through the ports 212 and 222, respectively. In this manner, the ports 212 and 222 can be sealed and the battery cell 210 can be tested.

Figure 6:
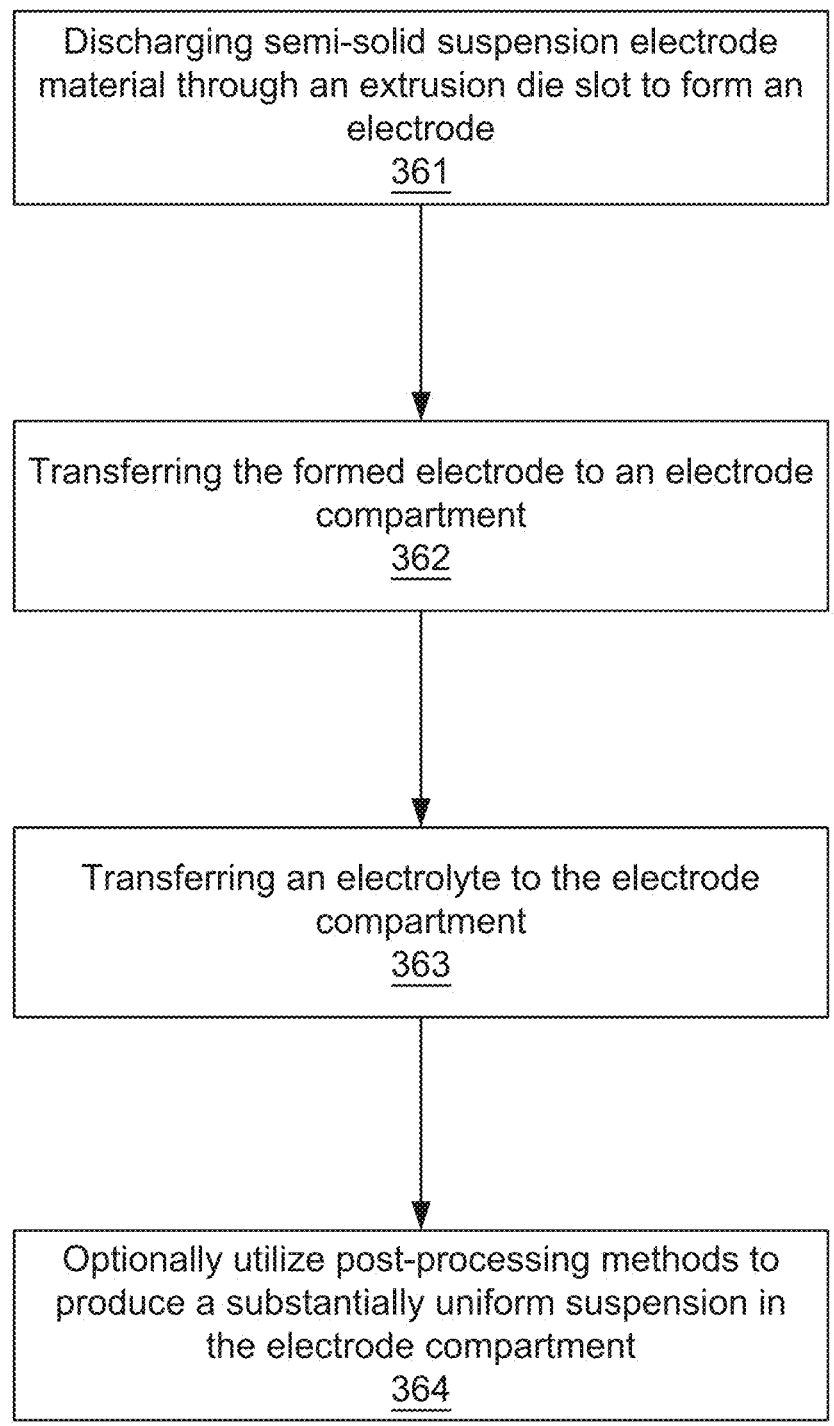
FIG. 6 is a flowchart illustrating a method of manufacturing an electrochemical cell, according to an embodiment.

While the system 200 describes a method for manufacturing an electrochemical cell using injection nozzles, in other embodiments, an electrochemical cell can be manufactured using any suitable method. For example, FIG. 6 illustrates a method 360 for manufacturing an electrochemical cell (e.g., any of those described herein), according to an embodiment. The method 360 includes discharging a semi-solid suspension electrode material through an extrusion die slot to form an electrode, at 361. The extrusion die can be such that the shape of the slot substantially corresponds to a geometry of an electrode compartment of the electrochemical cell. In this manner, the extruded semi-solid suspension electrode material (e.g., an anode slurry and/or cathode slurry) can have a geometry that substantially corresponds to the electrode chamber.

The method 360 includes transferring the formed electrode to the electrode compartment, at 362. In some embodiments, the extruded slurry can be gravity fed into the electrode compartment. In such embodiments, the physical properties of the electrode slurry can be such that the extruded slurry resists cross-sectional shape change and/or flexural distortion under the gravitational force (e.g., under hanging mass conditions). Thus, the shape of the extruded slurry can be such that a minimal tolerance exists between an outer surface of the extruded slurry and an inner surface of a set of walls defining the electrode compartment. In some embodiments, the method 360 can optionally include coating the extruded electrode slurry with any suitable material that can substantially enhance the transferring of the extruded slurry into the electrode compartment (e.g., an oil or the like to reduce sticking of the extruded slurry).

The method 360 can further include transferring an electrolyte to the electrode compartment when the electrode slurry is disposed therein, at 363. In this manner, the electrolyte can fill void regions within the electrode compartment defined between the electrode slurry and the walls defining the electrode compartment. With the electrolyte disposed within the electrode compartment, the electrode cell can be sealed. The method 360 can optionally include utilizing a post-processing method (e.g., mechanical vibration, sonication, axial acceleration, centrifugal acceleration, or the like) such that the electrolyte and the electrode slurry mix to define a substantially uniform suspension within the electrode compartment, at 364.

Figure 7:
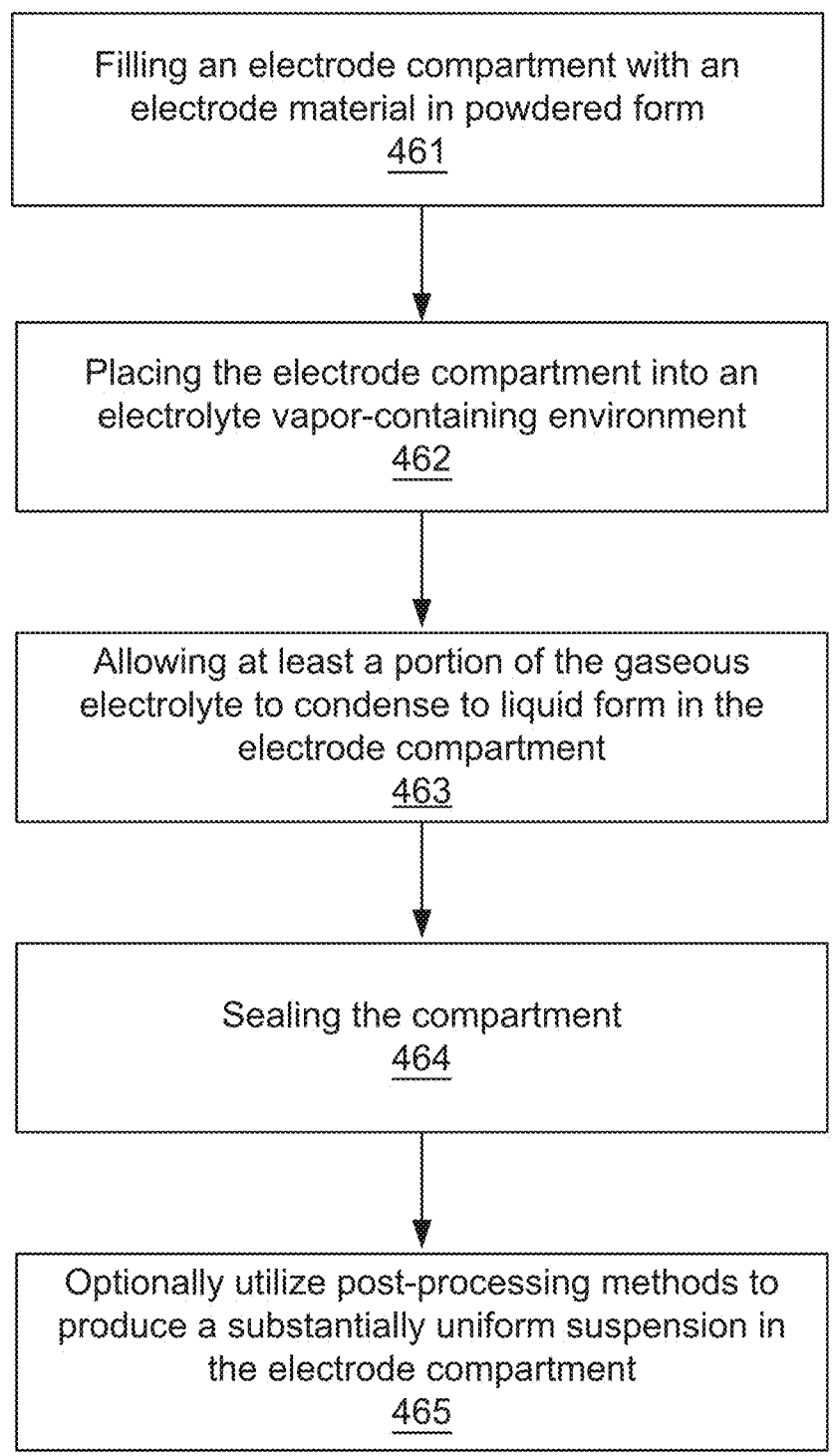
FIG. 7 is a flowchart illustrating a method of manufacturing an electrochemical cell, according to an embodiment.

FIG. 7 is a flowchart illustrating a method 460 for manufacturing an electrochemical cell (e.g., any of those described herein), according to an embodiment. The method 460 includes filling an electrode compartment with an electrode material in powdered form, at 461. The powdered electrode material can be composed of at least an active material (e.g., any of those described herein) and a conductive material (e.g., carbon). With the powdered electrode material disposed within the electrode compartment, the electrode cell can be placed in fluid communication with an electrolyte reservoir, at 462. In some embodiments, the electrolyte reservoir can be an electrolyte vapor-containing reservoir and the electrode cell can be at least partially disposed therein (e.g., some or all of the electrode cell can be disposed therein). Expanding further, the electrolyte vapor disposed within the electrolyte reservoir can be maintained at a temperature that is substantially greater than a temperature of the electrode compartment (e.g., the electrode compartment can be actively cooled). Similarly stated, a volume outside the electrode compartment can be at a substantially greater temperature than a volume inside the electrode compartment.

The method 460 further includes transferring a portion of the electrolyte vapor into the electrode compartment such that the electrolyte vapor condenses to liquid form within the electrode compartment, at 463. With the electrode compartment filled (e.g., by the powdered electrode material and the electrolyte), the method 460 can include sealing the electrode cell, at 464. The method 460 can optionally include utilizing a post processing method (e.g., mechanical vibration, sonication, axial acceleration, centrifugal acceleration, or the like) such that the electrolyte and the powdered electrode mix to define a substantially uniform suspension within the electrode compartment, at 465.

Figure 8:
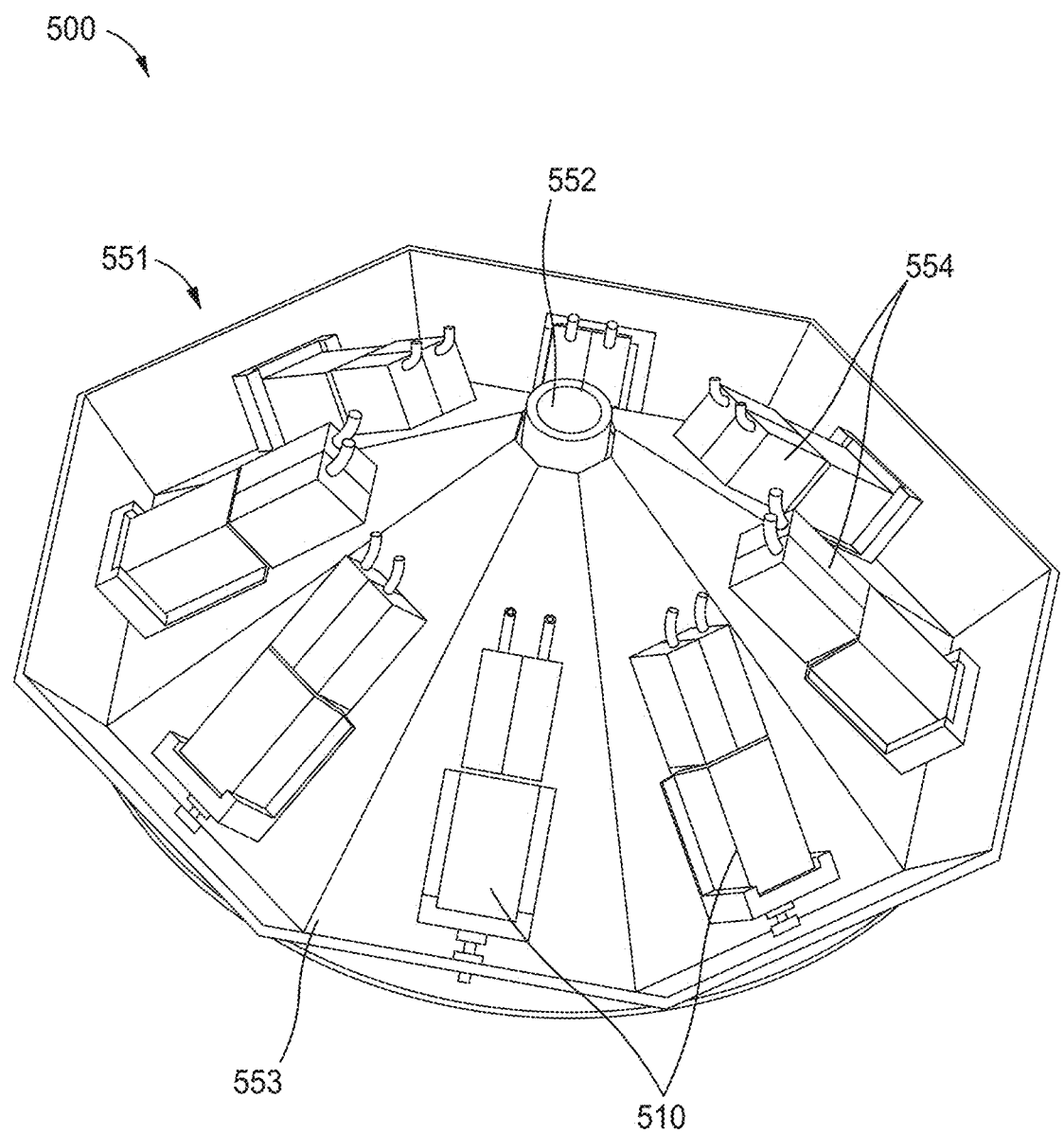
FIG. 8 illustrates a system for manufacturing an electrochemical cell, according to an embodiment.

Referring now to FIG. 8, a system 500 for manufacturing an electrochemical cell is illustrated, according to an embodiment. The system 500 includes a set of electrochemical cells 510 disposed on a portion of a centrifuge 551. The electrochemical cells 510 can be any of those described herein. The centrifuge 551 includes a center portion 552, an outer portion 553, and a set of reservoirs 554. As shown in FIG. 8, the electrochemical cells 510 can be disposed at the outer portion 553 of the centrifuge 551 and can be in fluid communication with the reservoirs 554. For example, the electrochemical cells 510 can include a port (not shown) that is in fluid communication with the reservoirs 554. Expanding further, the electrochemical cells 510 can be disposed at an outboard position on the centrifuge 551 relative to the reservoirs 554.

The reservoirs 554 can contain an electrode formulation or any portion thereof. For example, in some embodiments, the reservoirs 554 can include an anolyte and/or a catholyte, such as those described herein. In this manner, the centrifuge 551 can be rotated about an axis (not shown) defined by the inner portion 552 such that the electrode is transferred from the reservoirs 554 into the electrochemical cells 510 by the centripetal acceleration of the electrochemical cells 510. In some embodiments, the electrochemical cells 510 can be pre-disposed with an electrode in powdered form and the reservoirs 554 can contain an electrolyte. In such embodiments, the electrolyte can be transferred to the electrochemical cells 510, and mixing of the powdered electrode with the electrolyte can be facilitated by, the centripetal acceleration of the electrochemical cells 510. In some embodiments, the electrochemical cell 510 and/or the centrifuge 551 can be vibrated to facilitate the mixing of the powdered electrode and the electrolyte. In other embodiments, sonication can be used to facilitate mixing.

During any of the manufacturing methods described herein, transferring of an electrode material (e.g., a slurry) into an electrode compartment can be such that a separator (e.g., an ion permeable membrane) and/or a current collector at least partially defining the electrode compartment can be deformed. Such deformation can result in a generally unstable configuration as areas available for flow opposite the deformation increase, thereby leading to higher flow partitioning, increased deformation, and increased stress in the separator and/or current collector. In some embodiments, a post-treatment can be utilized that can substantially return the separator and/or current collector to an undeformed configuration. For example, in some embodiments, post-treatment can include full or partial submersion in an ultrasonic liquid bath, anchoring on a vibration table, placement in an acoustic chamber or environment, axial acceleration (e.g., in the direction of the thickness of the electrochemical cell), affixation of piezoelectric components to the cell hardware, heating and/or cooling, or any combination thereof. In such embodiments, the post-treatment can be such that the separator and/or current collector return to a substantially planar configuration. Furthermore, in some embodiments, the post-treatment can enhance uniformity of the electrode suspension and/or facilitate the development of an activated carbon network, thereby increasing electronic conductivity.

Figure 9:
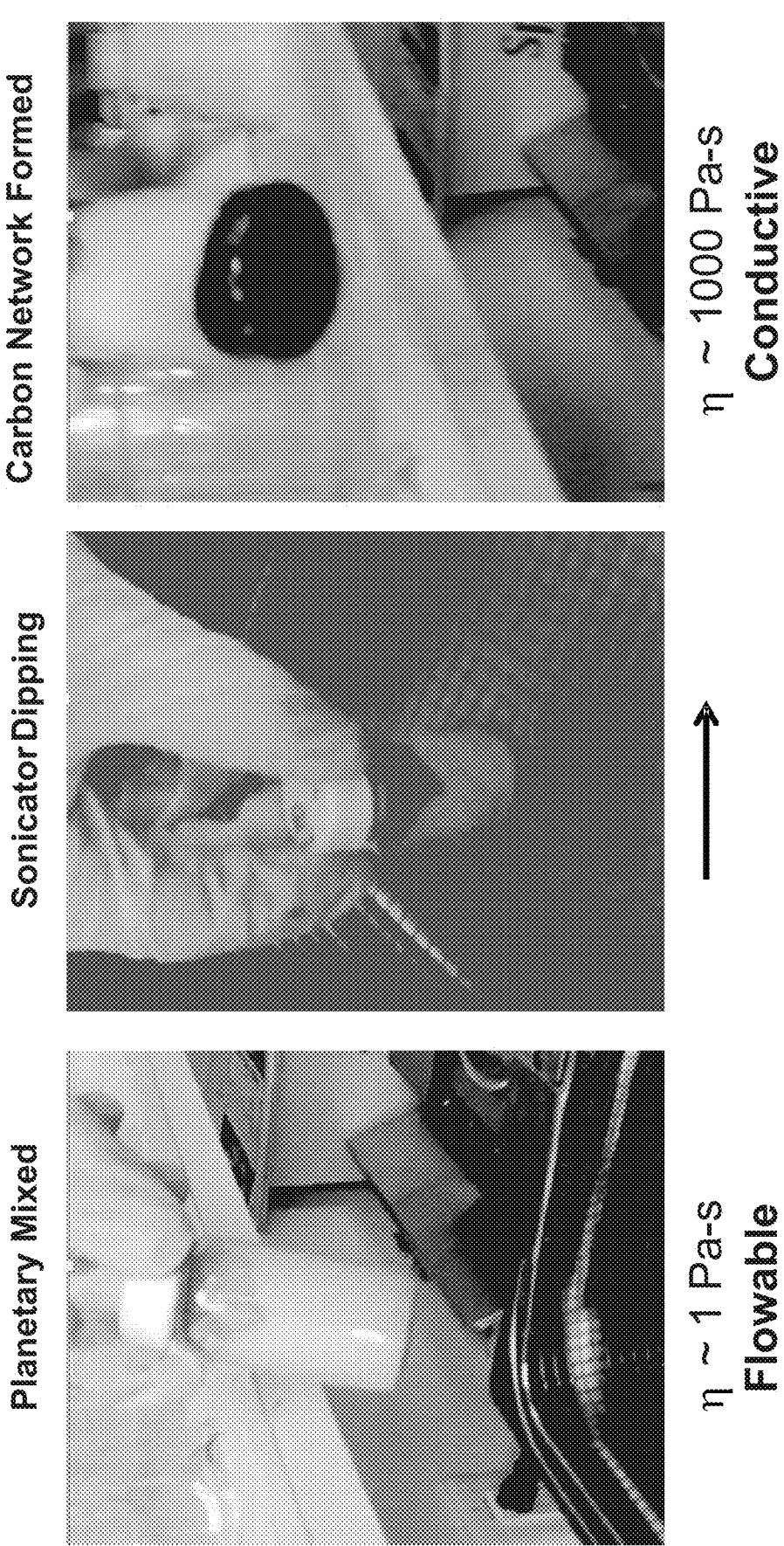
FIG. 9 is an illustration of an electrode in a first, second, and third configuration, according to an embodiment.

Expanding further, in some embodiments, a planetary mixer or similar blending device is used to create a homogenized mixture of at least active material, carbon, and electrolyte. In some embodiments, the carbon included in the suspension can exist as agglomerates. Fluids in this form are less viscous than fluids wherein the carbon is de-agglomerated, fibrillous, or networked and are therefore, more flowable (see e.g., FIG. 9).

Figures 10A, 10B:
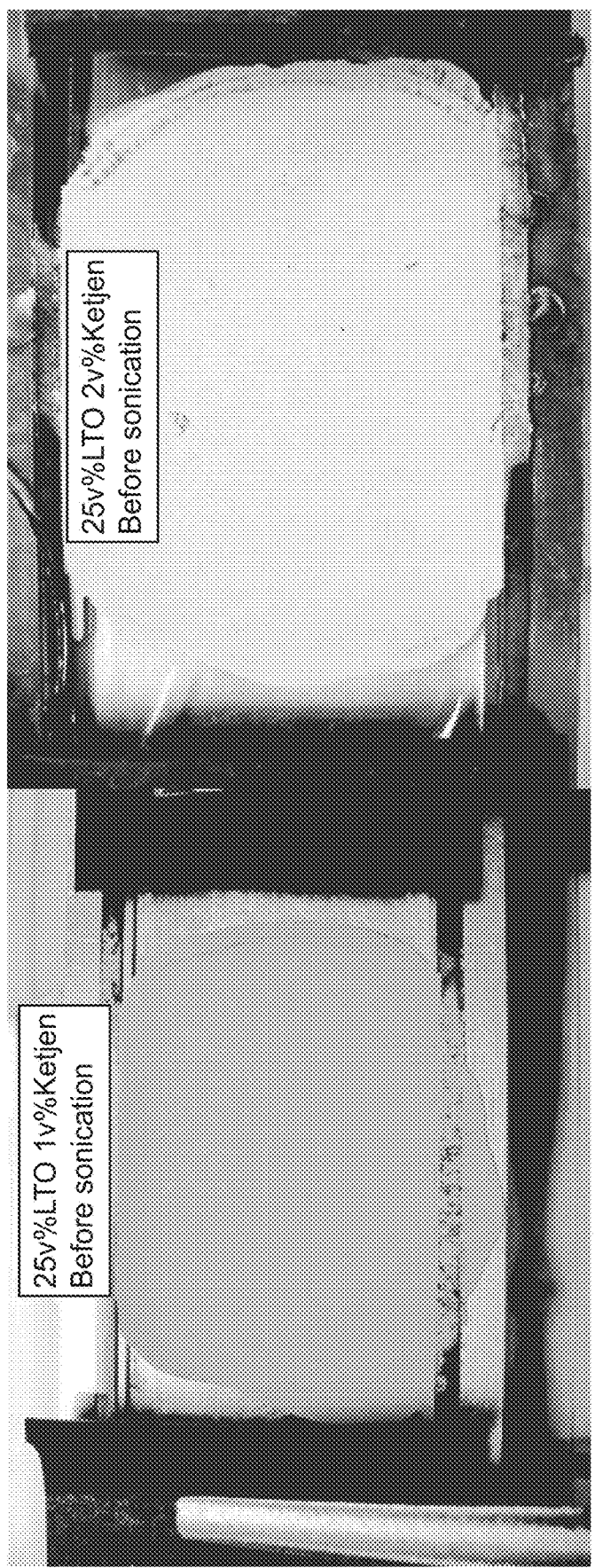
FIGS. 10A-10D illustrate a first electrode and a second electrode before and after a post-treatment, according to an embodiment.
Figures 10C, 10D:
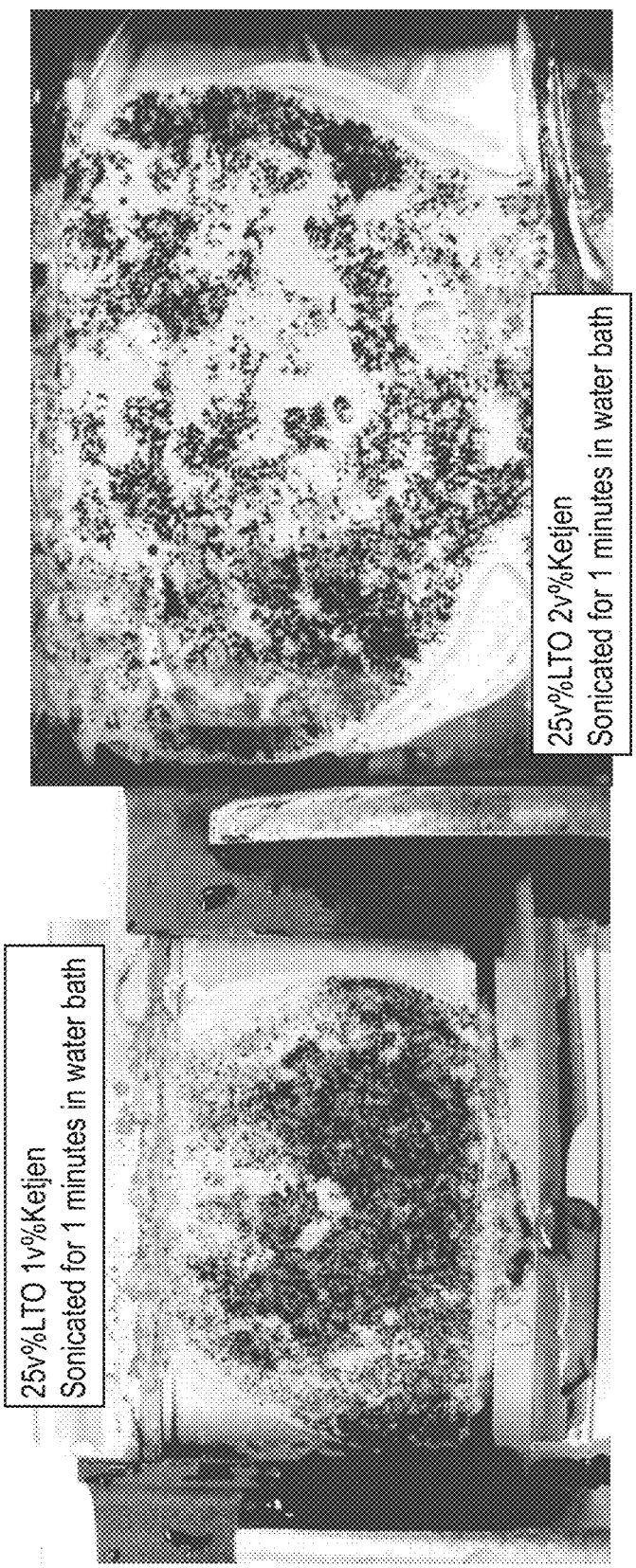

In some embodiments, the homogenized mixture can be injected into the cavity using any suitable means (which may include other of the embodiments described in this disclosure), and the cell assembly proceeds. In some embodiments, it can be desirable to subject the electrochemical cell (e.g., at least the electrode mixture) to ultrasonication or other vibratory process such that the carbon may de-agglomerate and form a fibrillous, electrically conducting network. For example, FIGS. 10A and 10B illustrate a homogenized electrode mixture of 25% volume of LTO 1% volume of Ketjen black electroconductive carbon black ("Ketjen") and 25% volume of LTO 2% volume of Ketjen, respectively, prior to sonication. The homogenized mixtures can be substantially flowable and can be disposed within an electrochemical cell. After being disposed within the electrochemical cell the electrode mixtures can be subjected to sonication such that an activated carbon network develops therein. For example, FIGS. 10C and 10D illustrate the 25% volume of LTO 1% volume of Ketjen mixture and the 25% volume of LTO 2% volume of Ketjen mixture, respectively, after one minute in a sonication bath. As shown, the carbon forms a de-agglomerated active network and thus, the electronic conductivity of the electrode mixtures are increased.

In some embodiments, other post-treatment processes can be utilized in conjunction with or separate from sonication. For example, increasing temperature, exposure to light, and/or imposition of electric current and/or magnetic fields can be used to produce similar effects, and can be collectively optimized for the purpose according to the types of materials in use. In other embodiments, it can be desirable to have an activated carbon network within the electrode prior to flowing the electrode into an electrode compartment. In such embodiments, the post-treatments described above can be used to enhance the flow of the electrode. In some embodiments, a vacuum can be applied to a portion of the electrode compartment to facilitate the flow of the electrode material.

Figure 11:
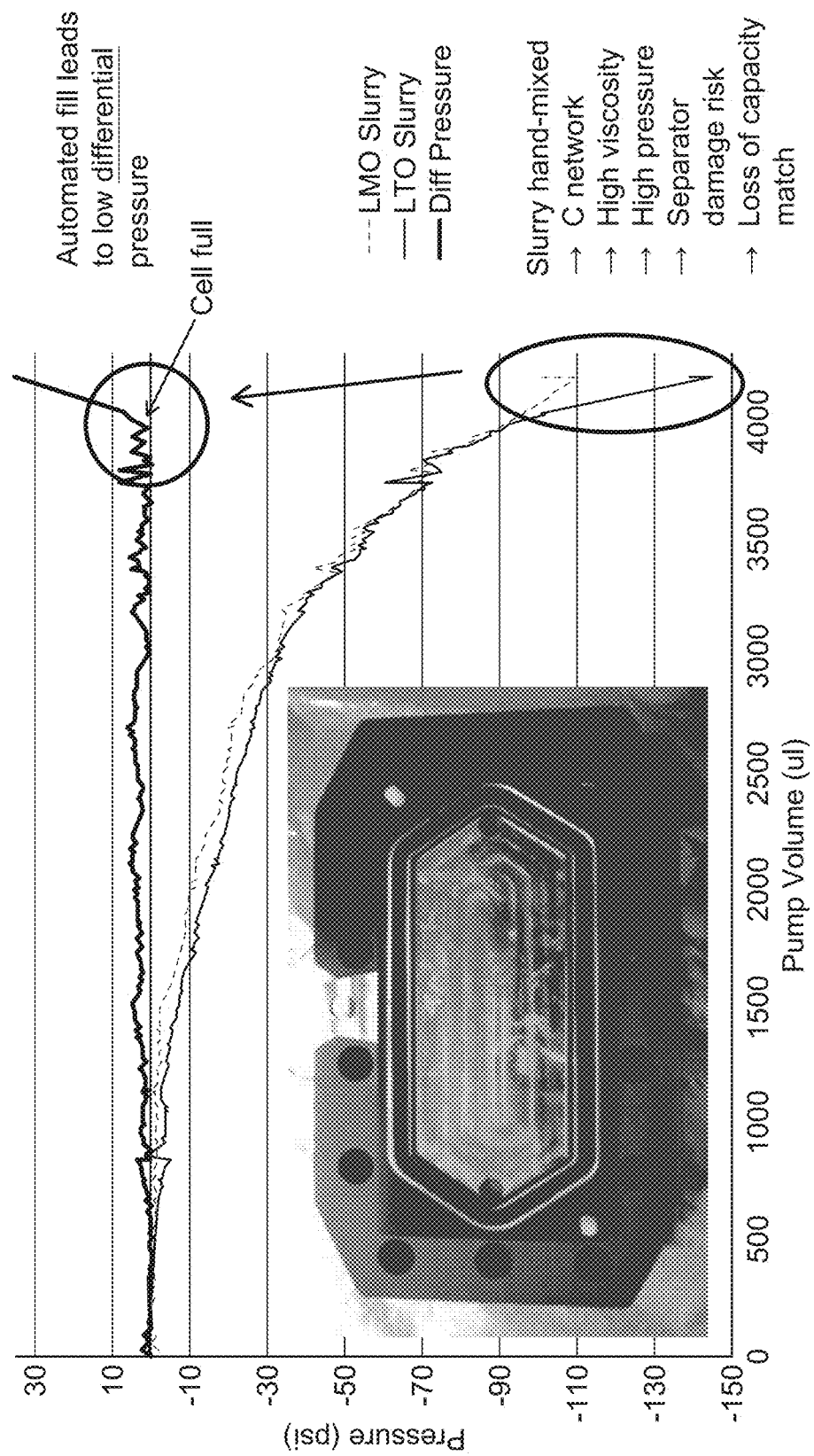
FIG. 11 is a graph describing a rheological property, according to an embodiment.

In some embodiments, deformation of a separator and/or current collector can be minimized by varying flow rates of an electrode material into an electrode compartment of an electrochemical cell. For example, in some embodiments, an anode compartment and cathode compartment can be filled concurrently such that pressures within the anode compartment substantially balance pressures within the cathode compartment, thereby minimizing deformation of the separator disposed therebetween. However, in some embodiments, the anolyte and catholyte (e.g., the electrode material) can have different rheological properties such that pressure gradients of the anolyte and catholyte are different and varied. In such embodiments, the flow rate of the anolyte and/or the catholyte can be varied such that the pressure gradients are substantially equal. In other embodiments, any suitable material can be added to the anolyte and/or catholyte to substantially change the rheological properties of the anolyte or the catholyte. The graph of FIG. 11 illustrates a relationship between a pressure and a pumped volume of the electrode. As shown, the feed pressure of the anolyte and the catholyte increase during the fill, each to over 100 psi once the cell is full. However, by filling the compartments concurrently, the differential pressure across a compartment-bounding element (e.g., separator or current collector) is reduced, thus reducing deformation of the compartment-bounding element during the fill process.

Figure 12B:
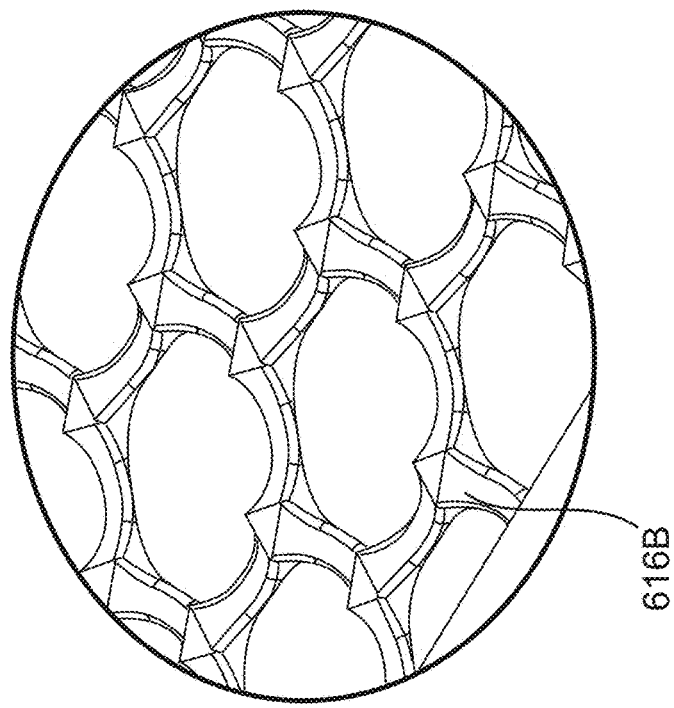
FIGS. 12A and 12B are illustrations of a support structure included in an electrochemical cell, according to an embodiment.
Figure 12A:
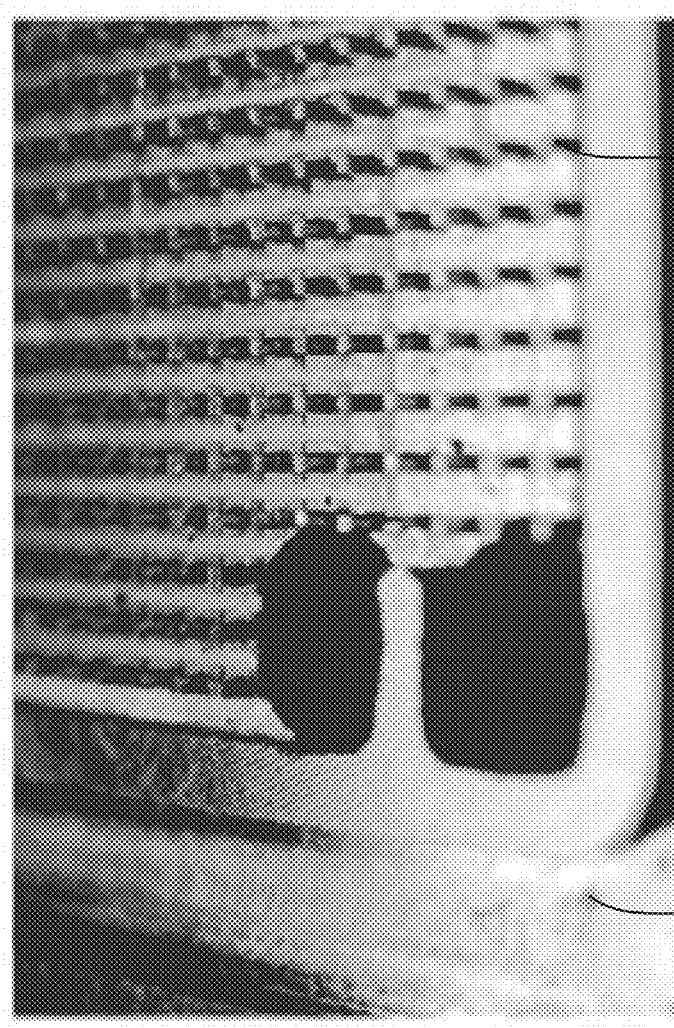

In some embodiments, deformation of a separator and/or current collector can be minimized by including support structures within the electrochemical cell. For example, FIGS. 12A and 12B illustrate portions of an electrode cell 611 (e.g., an anode cell or a cathode cell), according to an embodiment. As shown in FIG. 12A, the electrode cell 611 includes a current collector 613 having multiple support structures 616A. The support structures 616A can be configured to extend from the current collector 613 towards a separator (not shown in FIGS. 12 and 12B). In this manner, the support structures 616A can engage the separator to provide support during a fill process.

As shown in FIG. 12 A, the support structures 616A can be a pin-chuck style support (e.g., elongates extending from the current collector). In other embodiments, a support structure can be any suitable support member such as, for example, posts or ridges. For example, FIG. 12B illustrates a support structure 616B wherein the elongates substantially form a point. While shown as being monolithically formed with the current collector 613, in some embodiments, a support structure can be coupled to a current collector, monolithically formed with a separator, coupled to a separator, and/or independently disposed within an electrode compartment.

Figure 13:
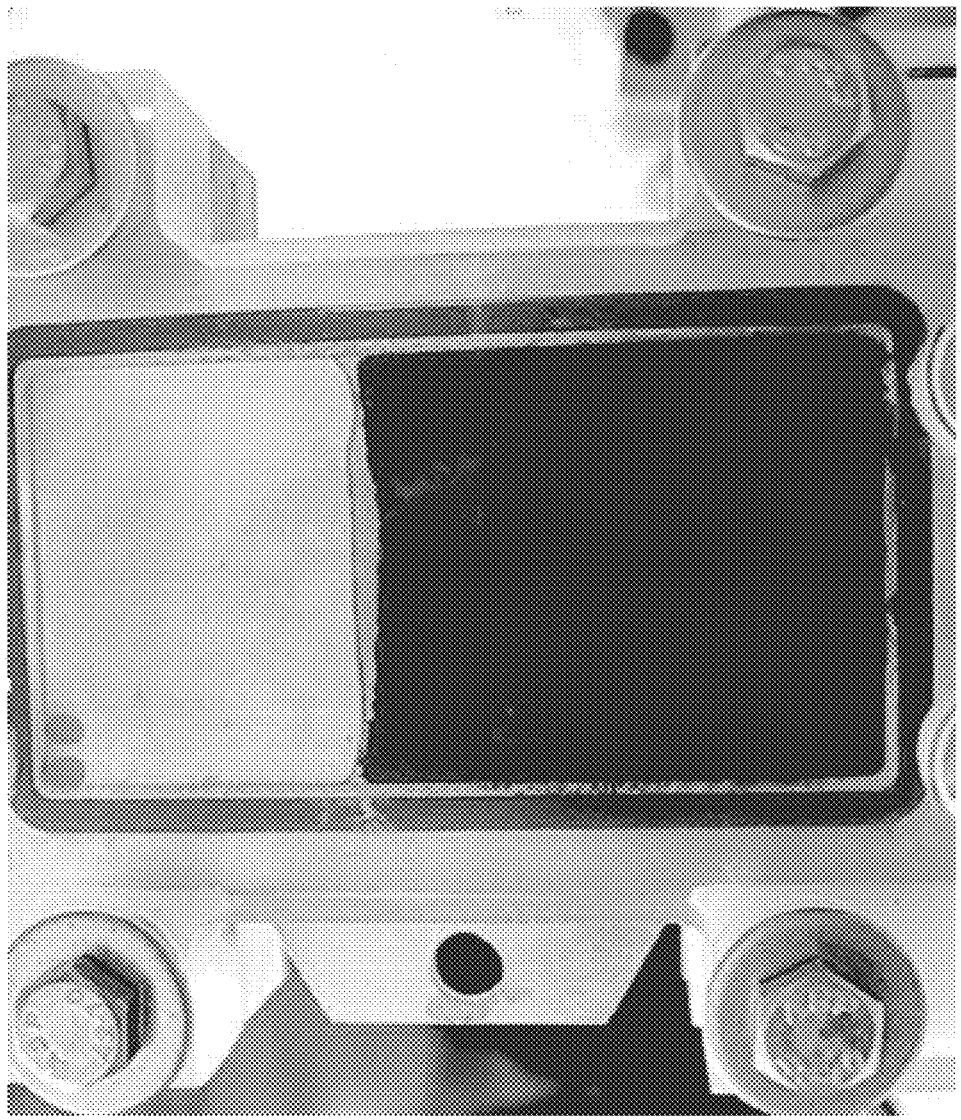
FIG. 13 is an illustration of an electrochemical cell during a fill process, according to an embodiment.

In use, the support structures 616 (e.g., 616A and/or 616B) can provide mechanical support, direct a flow of an electrode during assembly (or operation in the case of a flow cell), act as a substrate or material anchor, and/or facilitate enhanced electrical conductivity. In some embodiments, the sharp cornered supports can lead to solid phase segregation during a fill process. In such embodiments, the support structures can act like a filter such that a liquid phase emerges at the flow front (as shown in FIG. 13). Accordingly, the support structure can be designed to optimize the flow scheme of the electrode material and/or post-processing steps can be suitably selected to provide compositional uniformity of the suspension throughout the electrode compartment during fill and/or flow. In some embodiments, materials and surface roughness/treatments can be selected to modulate flow slip over the support structures. In some embodiments, the process conditions (e.g., flow rate, temperature, etc.) can be selected to maintain homogeneity.

While various embodiments have been described above, it should be understood that they have been presented by way of example only, and not limitation. For example, while the embodiments herein describe electrochemical devices such as, for example, lithium ion batteries, the systems, methods and principles described herein are applicable to all devices containing electrochemically active media. Said another way, any electrodes and/or devices including at least an active material (source or sink of charge carriers), an electronically conducting additive, and an ionically conducting media (electrolyte) such as, for example, batteries, capacitors, electric double-layer capacitors (e.g., ultracapacitors), pseudo-capacitors, etc., are within the scope of this disclosure. Furthermore, the embodiments can be used with non-aqueous and/or aqueous electrolyte battery chemistries.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed and/or omitted before proceeding to subsequent steps.

While various embodiments have been particularly shown and described, various changes in form and details may be made. For example, although various embodiments have been described as having particular features and/or combinations of components, other embodiments are possible having any combination or sub-combination of any features and/or components from any of the embodiments described herein. The specific configurations of the various components can also be varied.

The invention claimed is:

1. A method of forming an electrode, the method comprising:
   receiving, at an extruder and from a reservoir, a flow of an electrode material;
   disposing a support structure on a surface of a substantially planar current collector, wherein the support structure is configured to provide mechanical support of the electrode material during transfer of the electrode material;
   transferring the electrode material, via an opening of the extruder, to a surface of the substantially planar current collector;
   moving the extruder from a first position to a second position relative to the substantially planar current collector; and
   removing a portion of the electrode material to form the electrode.

2. The method of claim 1, wherein the support structure defines an opening configured to receive the electrode material.

3. The method of claim 2, wherein the support structure is configured to direct a flow of the electrode material.

4. The method of claim 1, wherein the transferring the electrode material is in a direction that is normal to the surface of the current collector.

5. The method of claim 1, wherein the opening of the extruder is at least one of a hanger die sheet extrusion die, a winter manifold sheet extrusion die, and a profile-style sheet extrusion die.

6. The method of claim 1, wherein the extruder includes a plurality of conduits.

7. The method of claim 1, further comprising: applying pressure to the electrode material during transferring of the electrode material.

8. The method of claim 1, wherein the electrode material is gravity-fed during transferring of the electrode material.

9. The method of claim 1, wherein the extruder is at least one of heated and vibrated during transferring of the electrode material.

10. The method of claim 1, wherein the opening of the extruder has a shape that corresponds to a geometry of the electrode.

11. The method of claim 1, wherein the electrode material is a mixture that includes an active material, a conductive material and an electrolyte.

12. The method of claim 1, wherein the extruder is monolithically formed.

13. A method of forming an electrode, the method comprising:
   receiving, at an injection tool and from a reservoir, an electrode material;
   disposing a support structure on a surface of a substantially planar current collector, the support structure and the substantially planar current collector at least partially defining a cavity, wherein the support structure is configured to provide mechanical support of the electrode material during flow of the electrode material;
   placing a nozzle of the injection tool at least partially into the cavity;
   flowing the electrode material, via the nozzle of the injection tool, onto a surface of the substantially planar current collector to define an electrode; and
   mechanically post-processing the electrode to make the electrode uniform.

14. The method of claim 13, wherein the electrode material comprises a substantially uniform suspension.

15. The method of claim 13, wherein the electrode material comprises a slurry.

16. The method of claim 13, wherein the nozzle comprises a slot.

17. The method of claim 13, further comprising:
   moving the injection tool from a first position to a second position relative to the substantially planar current collector.

18. A method of forming an electrode, the method comprising:
   receiving, at an injection tool and from a reservoir, an electrode material;

disposing a support structure on a surface of a substantially planar current collector, wherein the support structure is configured to provide mechanical support of the electrode material during discharge of the electrode material;
discharging the electrode material, via a movable nozzle of the injection tool, onto a surface of substantially planar current collector to define an electrode
moving the injection tool from a first position to a second position relative to the substantially planar current collector; and
subsequently removing a portion of the electrode.

19. The method of claim 18, further comprising flowing the electrode material onto the surface of the current collector via a port.

20. The method of claim 18, wherein the electrode has a polygonal shape.

21. The method of claim 18, wherein the electrode material is at least one of a flowable anodic semi-solid and a flowable cathodic semi-solid.

* * * * *

UNITED STATES PATENT AND TRADEMARK OFFICE
CERTIFICATE OF CORRECTION

PATENT NO. : 10,566,603 B2
APPLICATION NO. : 14/926760
DATED : February 18, 2020
INVENTOR(S) : Alexander H. Slocum et al.

It is certified that error appears in the above-identified patent and that said Letters Patent is hereby corrected as shown below:

In the Specification

After Column 1, Line 15 ("Cross-Reference to Related Applications" Section) and before Column 1, Line 17 ("Background" Section), the following should be inserted:
--STATEMENT REGARDING FEDERALLY SPONSORED RESEARCH OR DEVELOPMENT
This invention was made with government support under Grant Number DE-AR0000102 awarded by the Department of Energy. The government has certain rights in this invention.--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*